United States Patent
Kondo

(10) Patent No.: US 7,961,632 B2
(45) Date of Patent: Jun. 14, 2011

(54) COMMUNICATION APPARATUS AND OAM FRAME TRANSMISSION METHOD

(75) Inventor: Masanori Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 12/457,169

(22) Filed: Jun. 2, 2009

(65) Prior Publication Data

US 2010/0020698 A1    Jan. 28, 2010

(30) Foreign Application Priority Data

Jul. 23, 2008    (JP) ................................. 2008-189912

(51) Int. Cl.
H04L 12/26    (2006.01)
(52) U.S. Cl. .................................................. 370/241.1
(58) Field of Classification Search .......... 370/229–232, 370/235, 241, 241.1, 242; 709/230, 231, 709/232

See application file for complete search history.

(56) References Cited

U.S. PATENT DOCUMENTS

| | | | | |
|---|---|---|---|---|
| 5,392,280 A | * | 2/1995 | Zheng ........................... | 370/353 |
| 5,533,020 A | * | 7/1996 | Byrn et al. ................. | 370/395.4 |
| 5,960,215 A | * | 9/1999 | Thomas et al. ................. | 710/52 |
| 6,711,140 B1 | * | 3/2004 | Agarwal et al. ............... | 370/324 |
| 6,993,041 B2 | * | 1/2006 | Yamamoto ...................... | 370/413 |
| 7,085,847 B2 | * | 8/2006 | Darnell et al. ................ | 709/232 |
| 7,466,703 B1 | * | 12/2008 | Arunachalam et al. ........ | 370/392 |
| 2003/0152084 A1 | * | 8/2003 | Lee et al. ................. | 370/395.21 |
| 2004/0125815 A1 | * | 7/2004 | Shimazu et al. ............. | 370/411 |
| 2007/0230492 A1 | * | 10/2007 | Ugai et al. ..................... | 370/412 |
| 2008/0002617 A1 | * | 1/2008 | Peisa et al. .................... | 370/329 |
| 2009/0196188 A1 | * | 8/2009 | Takeyoshi et al. ............. | 370/242 |
| 2010/0085887 A1 | * | 4/2010 | Ray et al. ...................... | 370/252 |

FOREIGN PATENT DOCUMENTS

JP    2007-251541    9/2007
WO    2009/098757 A1    8/2009

* cited by examiner

*Primary Examiner* — Chi H. Pham
*Assistant Examiner* — Robert Lopata
(74) *Attorney, Agent, or Firm* — Fujitsu Patent Center

(57) ABSTRACT

A disclosed communication apparatus of one embodiment of the present disclosure includes a transmitting unit including a counter for counting the number of transmitted data frames and indicating the counted number of the transmitted data frames as a counter value and a scheduler for determining a frame transmission order, and configured to transmit one or more data frames and a monitoring and control frame which includes the counter value; and a generating unit configured to generate the monitoring and control frame. When generating the monitoring and control frame, the generating unit corrects the counter value included in the monitoring and control frame according to the frame transmission order.

16 Claims, 30 Drawing Sheets

FIG.2A

| | 1 | 2 | 3 | 4 |
|---|---|---|---|---|
| | 8 7 6 5 4 3 2 1 | 8 7 6 5 4 3 2 1 | 8 7 6 5 4 3 2 1 | 8 7 6 5 4 3 2 1 |
| 1 | MEL | Version (0) | OpCode (LMM=43) | Flags (0) | TLV Offset (12) |
| 5 | TxFCf |
| 9 | Reserved for RxFCf in LMR |
| 13 | Reserved for TxFCb in LMR |
| 17 | End TLV (0) |

FIG.2B

| | 1 | 2 | 3 | 4 |
|---|---|---|---|---|
| | 8 7 6 5 4 3 2 1 | 8 7 6 5 4 3 2 1 | 8 7 6 5 4 3 2 1 | 8 7 6 5 4 3 2 1 |
| 1 | MEL | Version | OpCode (LMR=42) | Flags | TLV Offset |
| 5 | TxFCf |
| 9 | RxFCf |
| 13 | TxFCb |
| 17 | End TLV (0) |

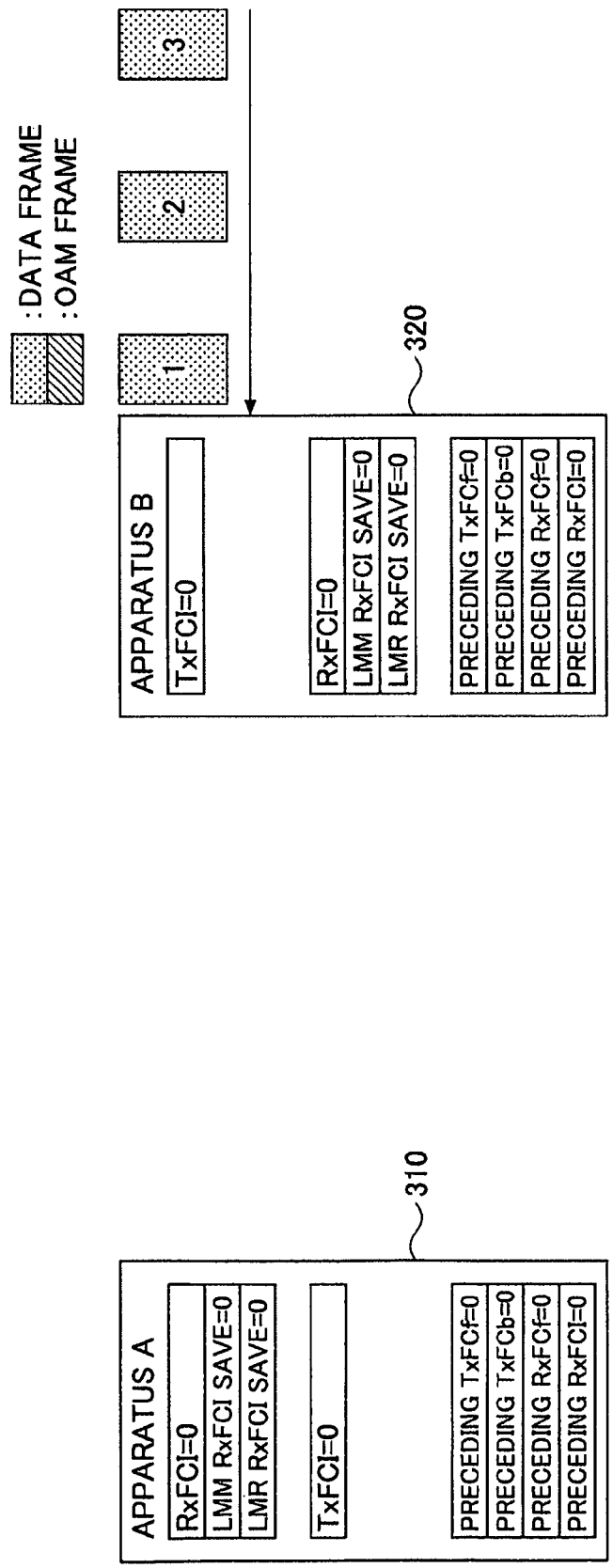

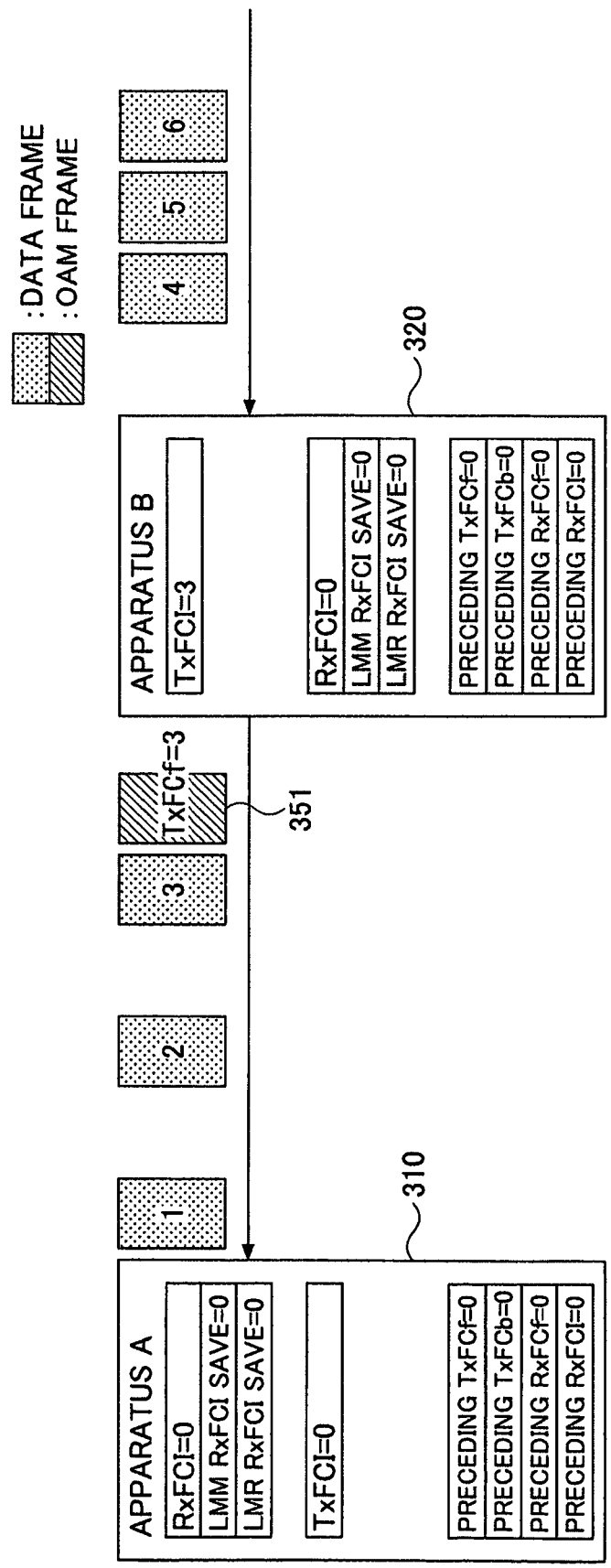

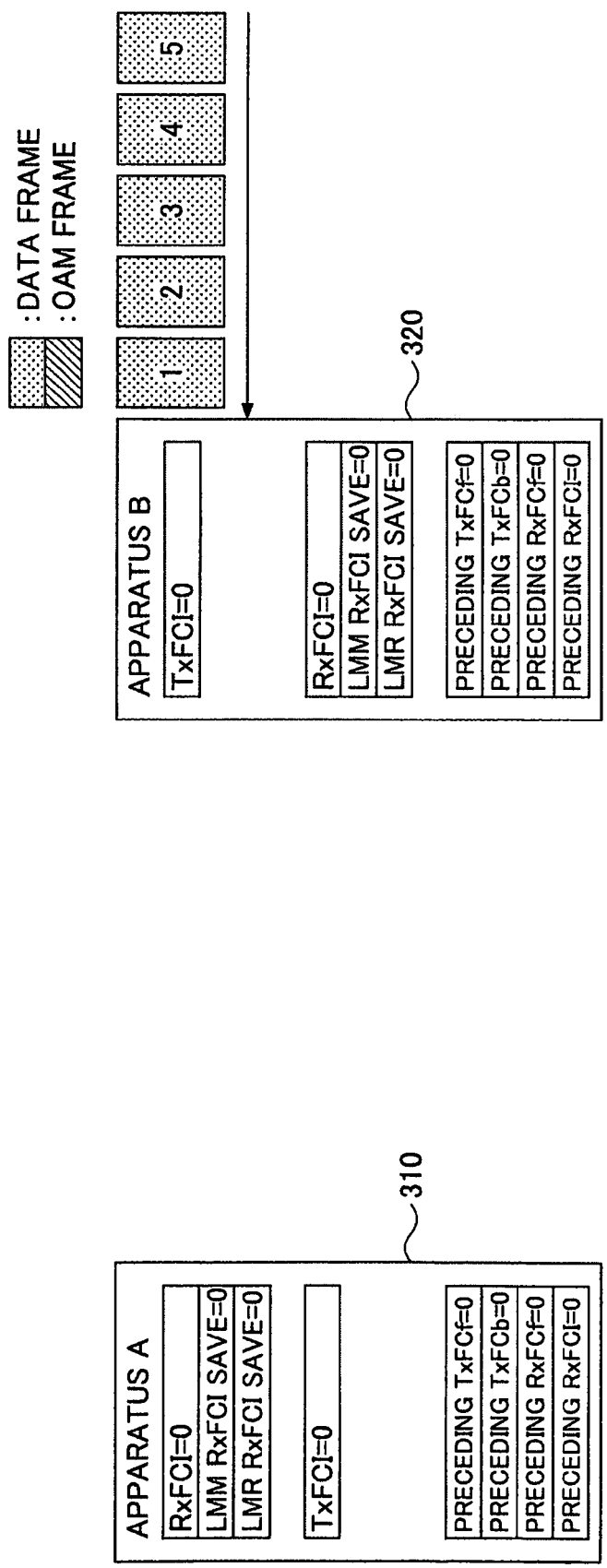

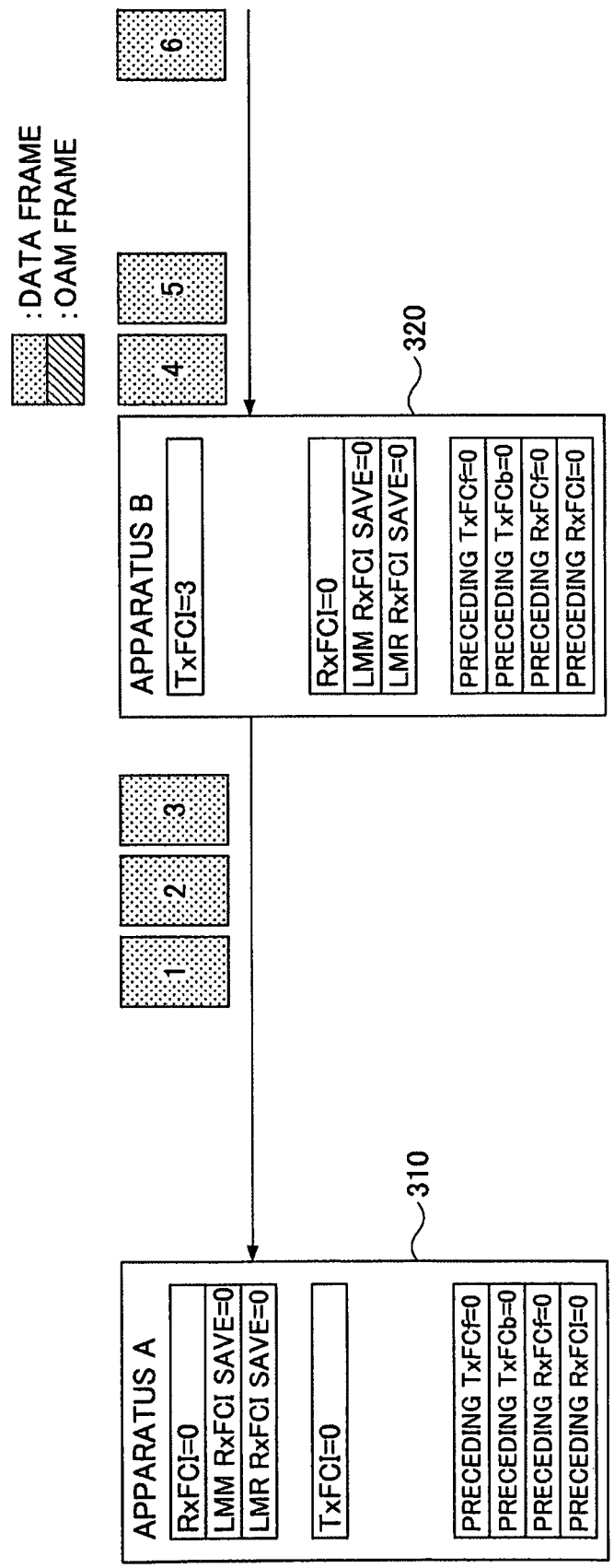

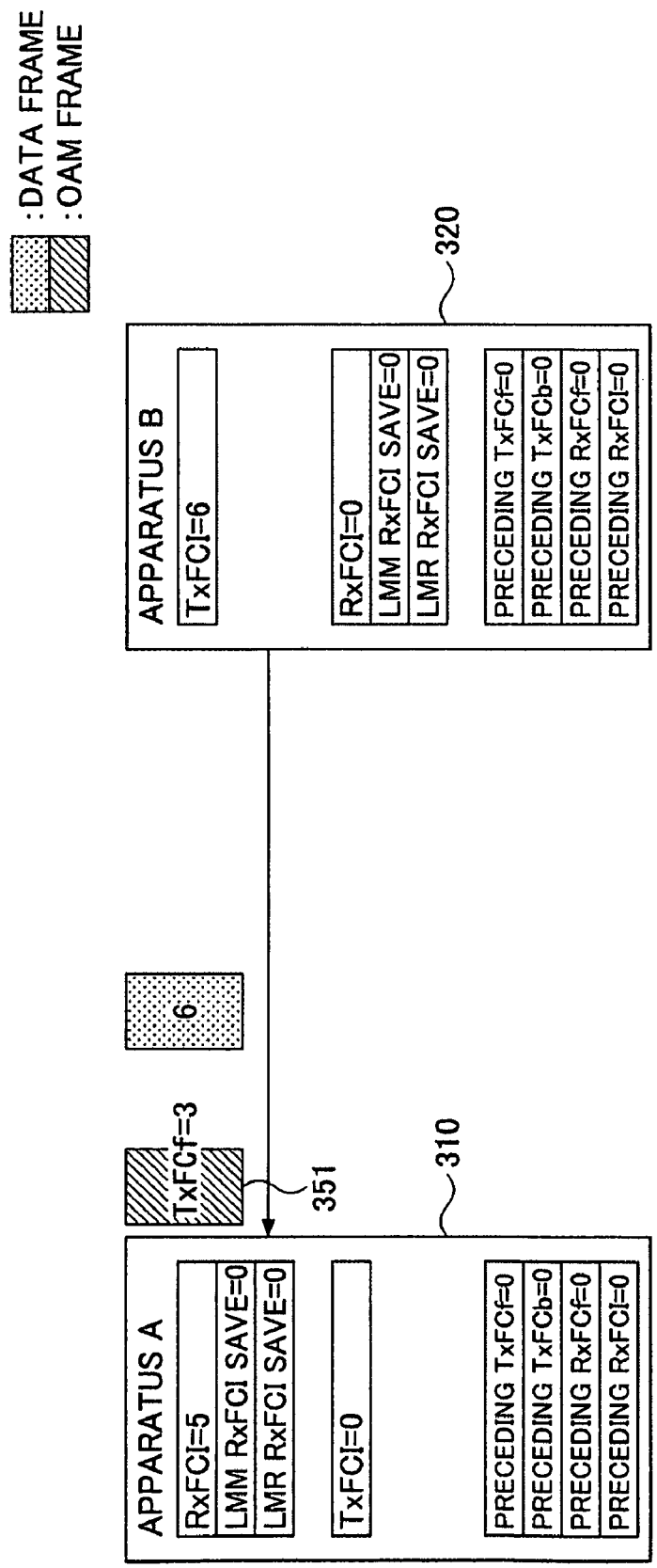

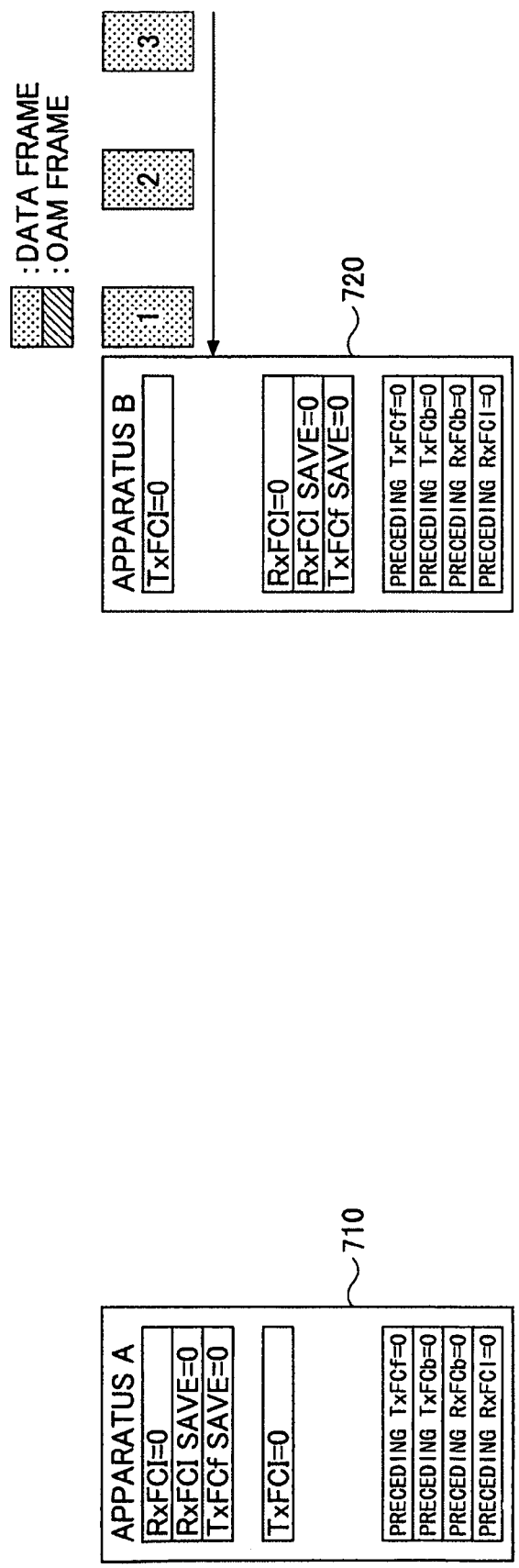

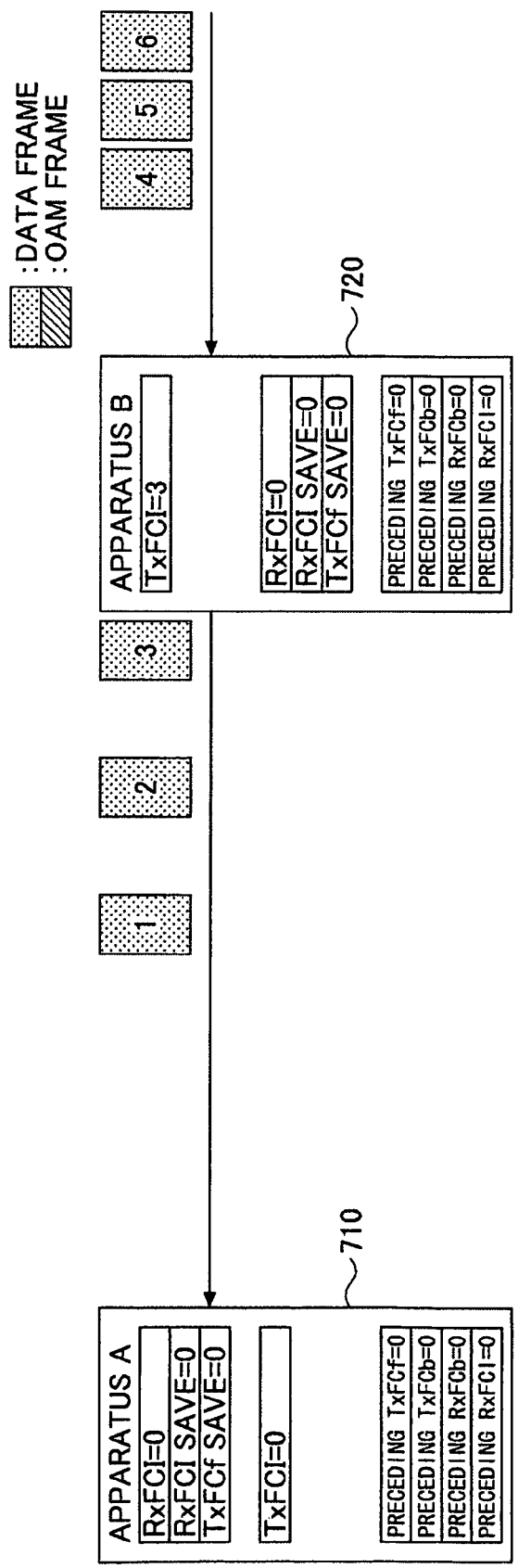

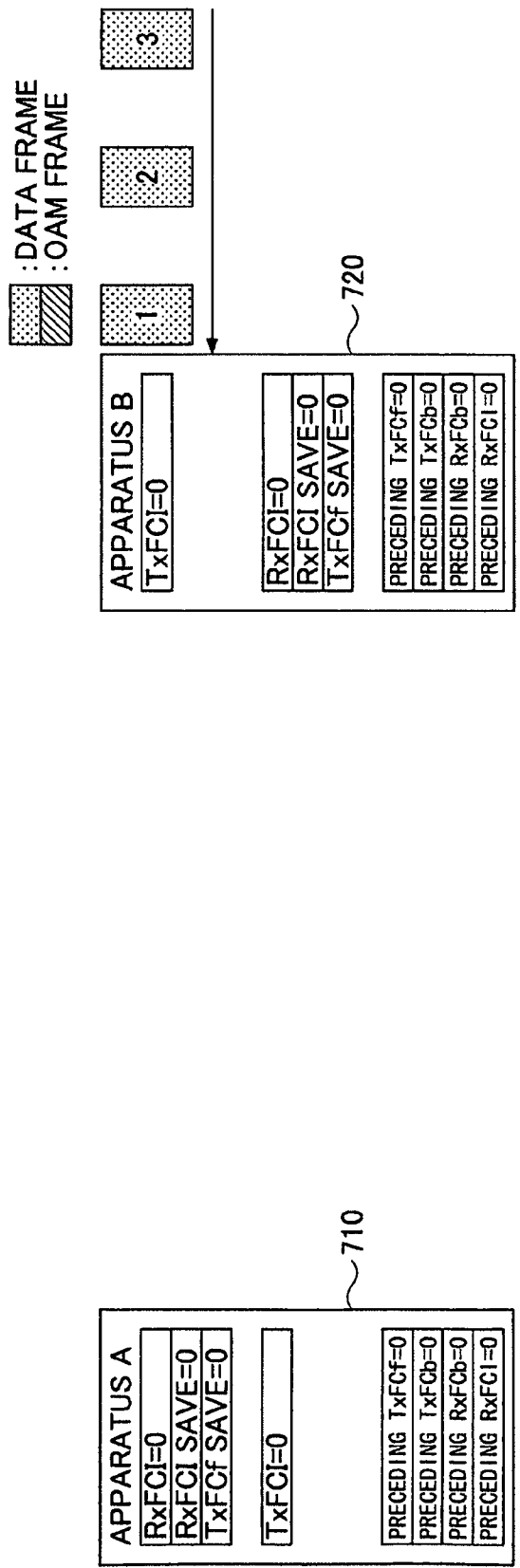

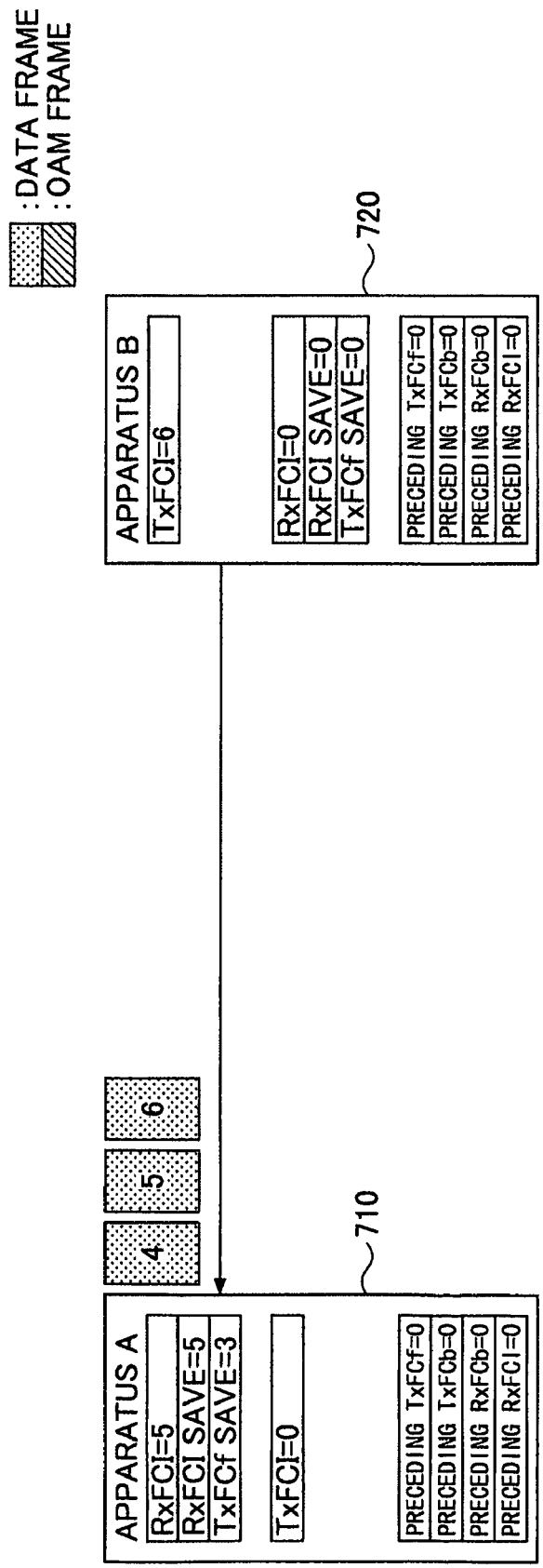

COMMUNICATION APPARATUS AND OAM FRAME TRANSMISSION METHOD

CROSS-REFERENCE TO RELATED APPLICATIONS

This application is based upon and claims the benefit of priority of Japanese Patent Application 2008-189912, filed on Jul. 23, 2008, the entire contents of which are incorporated herein by reference.

FIELD

The present disclosure is directed to frame loss measurements in a communications network, and in particular to a communication apparatus, an interface card and an OAM frame transmission method.

BACKGROUND

Ethernet (registered trademark), which has been developed as local area network (LAN) technology, is beginning to be applied to large-scale carrier networks. Conventionally, Ethernet (registered trademark) had few functions related to Operation, Administration and Maintenance (hereinafter, "OAM") for large-scale networks; however, with increased use of Ethernet in carrier networks, there is a growth in demand for OAM functions. According to Ethernet Frame Loss Measurements ("ETH-LM"), which have been standardized by ITU-T SG 13 as Y.1731, the number of transmission packets or the number of reception packets is stored in an OAM frame (which is a monitoring and control Ethernet frame), and the OAM frame is then output to report the number to the other end of the communication.

Subsequently, the reported number of transmission packets in the OAM frame is compared with the number of actually received packets, or the reported number of reception packets in the OAM frame is compared with the number of actually transmitted packets. Herewith, loss of packets, that is, frame loss can be measured. There are two types of measurement methods for ETH-LM, Single-ended ETH-LM and Dual-ended ETH-LM.

These two methods differ in the type of OAM frames used, information stored in OAM frames and output, and the frame loss calculation method; however, in both the methods, when an OAM frame is transmitted, the count number (counter value) of packets (data frames) transmitted by the time when the OAM frame is transmitted is stored in the OAM frame.

Various studies of OAM functions for Ethernet (registered trademark) have been conducted. For example, Japanese Laid-open Patent Application Publication No. 2007-251541 discloses an invention in which when a transmitting side periodically transmits management frames to a destination side, the transmitting side specifies, in each management frame, a transmission cycle used on the transmitting side, thereby being able to adjust the transmission cycle of the management frame.

However, since data frames are not transmitted at regular temporal intervals, a subsequent data frame may be transmitted before the counter value is stored in an OAM frame and then transmitted. This leads to the problem that the counter value in the OAM frame disagrees with the number of data frames actually transmitted.

For example, assume the case in which there are many data frames to be transmitted and the data frames are transmitted in a continuous fashion.

For transmitting OAM frames, a method may be adopted in which an OAM frame including a counter value is made by referring to the counter value of transmitted data frames, and then output from an output port used also for outputting data frames.

In this case, if a data frame is transmitted before the output of the OAM frame, the counter value included in the OAM frame is smaller than the number of data frames transmitted by the time of the output of the OAM frame.

This problem can be prevented if transmission of the subsequent data frame is suspended until the OAM frame is output. However, the first priority should be placed on transmission of data frames that include user data, thus leaving a problem.

SUMMARY

In order to solve at least one of the problems described above, the communication apparatus of one embodiment of the present disclosure includes a transmitting unit including a counter for counting the number of transmitted data frames and indicating the counted number of the transmitted data frames as a counter value and a scheduler for determining a frame transmission order, and configured to transmit one or more data frames and a monitoring and control frame which includes the counter value; and a generating unit configured to generate the monitoring and control frame. When generating the monitoring and control frame, the generating unit corrects the counter value included in the monitoring and control frame according to the frame transmission order.

Another aspect of the present disclosure is a shelf-type communication apparatus including multiple line-card type communication apparatuses, each of which includes a transmitting unit including a counter for counting the number of transmitted data frames and indicating the counted number of the transmitted data frames as a counter value and a scheduler for determining a frame transmission order, and is configured to transmit one or more data frames and a monitoring and control frame which includes the counter value. Each of the line-card type communication apparatuses also includes a generating unit configured to generate the monitoring and control frame. When generating the monitoring and control frame, the generating unit corrects the counter value included in the monitoring and control frame according to the frame transmission order. Each of the line-card type communication apparatuses is inserted into a corresponding slot of the shelf-type communication apparatus.

Yet another aspect of the present discloser is a monitoring and control frame transmission method including counting the number of transmitted data frames and indicating the counted number of the transmitted data frames as a counter value; determining a frame transmission order of one or more data frames and a monitoring and control frame to be transmitted, the monitoring and control frame including the counter value; generating the monitoring and control frame including the counted number of the data frames; and transmitting the one or more data frames and the monitoring and control frame based on the frame transmission order. The counter value included in the monitoring and control frame is corrected according to the frame transmission order.

Yet another aspect of the present disclosure is a computer program for causing a computer to execute a counting step of counting the number of transmitted data frames and indicating the counted number of the transmitted data frames as a counter value; a determining step of determining a frame transmission order of one or more data frames and a monitoring and control frame to be transmitted, the monitoring and control frame including the counter value; a generating step of generating the monitoring and control frame including the counted number of the data frames; and a transmitting step of transmitting the one or more data frames and the monitoring and control frame based on the frame transmission order. The counter value included in the monitoring and control frame is corrected according to the frame transmission order.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A through 2C show OAM frames complying with Y.1731;

FIGS. 4A through 4E illustrate the case in which loss measurements are performed normally;

FIGS. 5A through 5E illustrate the case in which loss measurements are not performed normally;

FIGS. 8A through 8E illustrate the case in which loss measurements are performed normally;

FIGS. 9A through 9E illustrate the case in which loss measurements are not performed normally;

DESCRIPTION OF EMBODIMENTS

Figure 1:
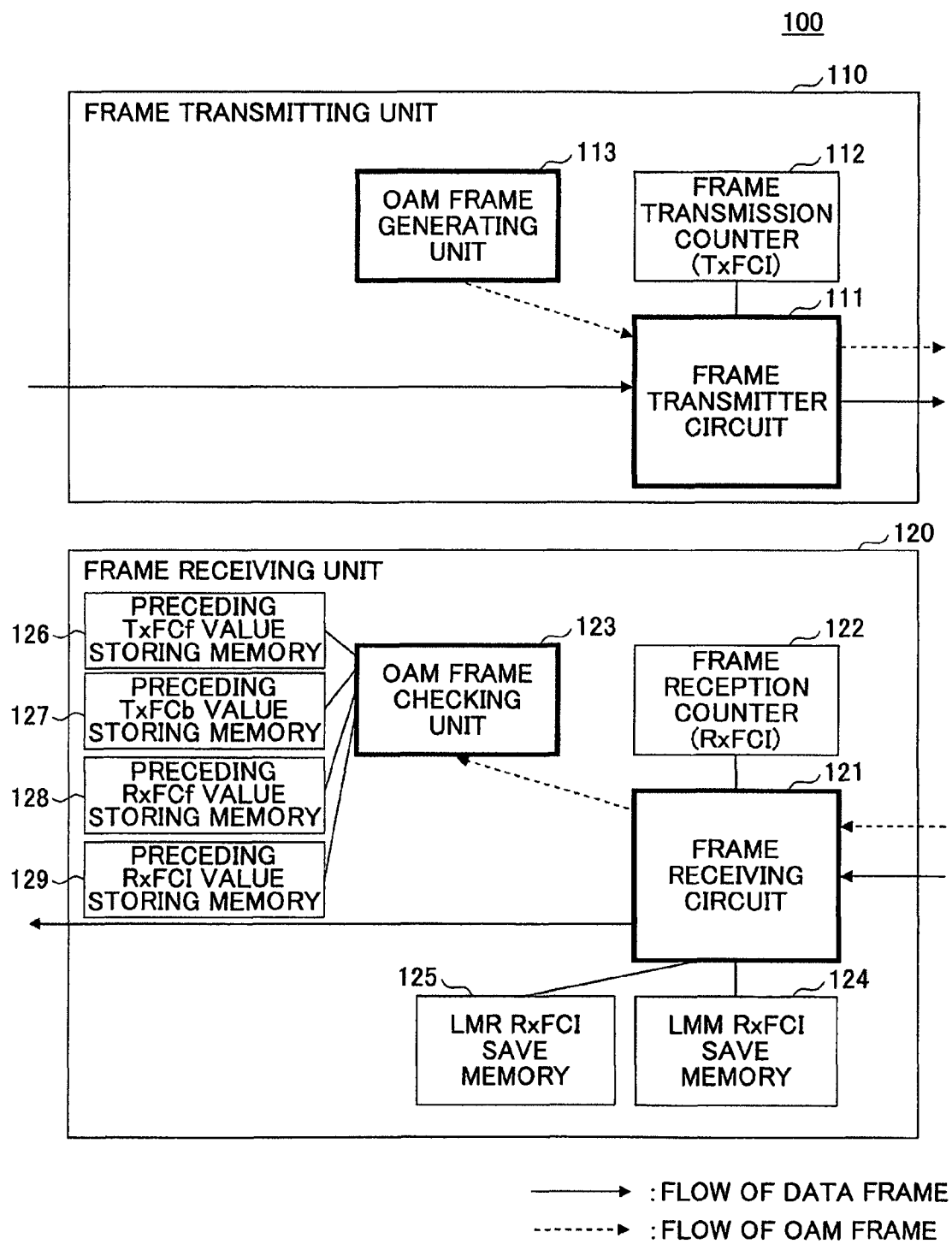
FIG. 1 is a block diagram of a single-ended communication apparatus complying with Y.1731.

Embodiments that describe the best mode for carrying out the present disclosure are explained next in detail with reference to the drawings. In the drawings, the same reference numerals are given to components which are common or similar.

The following embodiments are explained on the assumption of communication on Ethernet (registered trademark); however, it is apparent to those skilled in the art that the embodiments are applicable to not only Ethernet (registered trademark), but also other packet networks (e.g. SONET and fiber channel) having similar problems.

First, detailed explanations are given on the operation of the ETH-LM methods set forth in Y.1731, and then their problems.

[Single-Ended ETH-LM]

FIG. 1 shows a single-ended communication apparatus complying with Y.1731. A communication apparatus 100 of FIG. 1 includes a frame transmitting unit 110 for transmitting various frames. The frame transmitting unit 110 includes a frame transmitter circuit 111 for transmitting data frames and OAM frames, which the OAM frames are monitoring and control frames; a frame transmission counter (TxFCI) 112 for counting up at the time of data frame transmission; and an OAM frame generating unit 113 for generating an OAM request frame (LMM) or an OAM response frame (LMR) in response to reception of an OAM transmission request, and requesting the frame transmitter circuit 111 to transmit the generated OAM frame.

The communication apparatus 100 also includes a frame receiving unit 120 for receiving an input frame. The frame receiving unit 120 includes a frame receiving circuit 121, a frame reception counter 122, and an OAM frame checking unit 123. The frame receiving circuit 121 receives data frames and OAM frames, which the OAM frames are monitoring and control frames. If receiving an OAM request frame (LMM), the frame receiving circuit 121 stores the value of the frame reception counter (RxFCI) 122 in an LMM RxFCI save memory 124. If receiving an OAM response frame (LMR), the frame receiving circuit 121 stores the value of the frame reception counter (RxFCI) 122 in an LMR RxFCI save memory 125. Then, the frame receiving circuit 121 reports the received OAM frame to the OAM frame checking unit 123. The frame reception counter (RxFCI) 122 counts up at the time of data frame reception. When receiving an OAM frame, the OAM frame checking unit 123 checks the frame. If it is an OAM request frame (LMM), the OAM frame checking unit 123 requests an OAM frame generating unit (e.g. the OAM frame generating unit 113 of the frame transmitting unit 110) to generate an OAM response frame (LMR). If it is an OAM response frame (LMR), the OAM frame checking unit 123 performs frame loss measurements. The OAM frame checking unit 123 includes memories 126 through 129 in which the preceding TxFCf, the preceding TxFCb, the preceding RxFCf, the preceding RxFCl, and the second preceding RxFCl are stored. Note that in this application, the term "preceding" means being immediately preceding.

Note that the frame transmission counter (TxFCI) 112 and frame reception counter (RxFCI) 122 of FIG. 1 do not count OAM frames, and count only data frames.

FIGS. 2A and 2B show OAM frames of the single-ended ETH-LM complying with Y.1731. FIG. 2A shows a frame format of an OAM request frame (LMM), and FIG. 2B shows a frame format of an OAM response frame (LMR). Only items related to the present embodiment are explained here. In FIGS. 2A and 2B, "TxFCf" indicates a data frame transmission counter, and "RxFCf" indicates a data frame reception counter. In the case of an OAM request frame (LMM), "TxFCf" indicates the value of TxFCI at the time of transmission of the OAM request frame (LMM), and in the case of an OAM response frame (LMR), "TxFCf" is a copy of TxFCf in a corresponding OAM request frame (LMM). "RxFCf" indicates the value of RxFCI of an apparatus A at the time of receiving an OAM request frame (LMM). "TxFCb" indicates the value of TxFCI of the apparatus A at the time of transmission of an OAM response frame (LMR).

Figure 3:
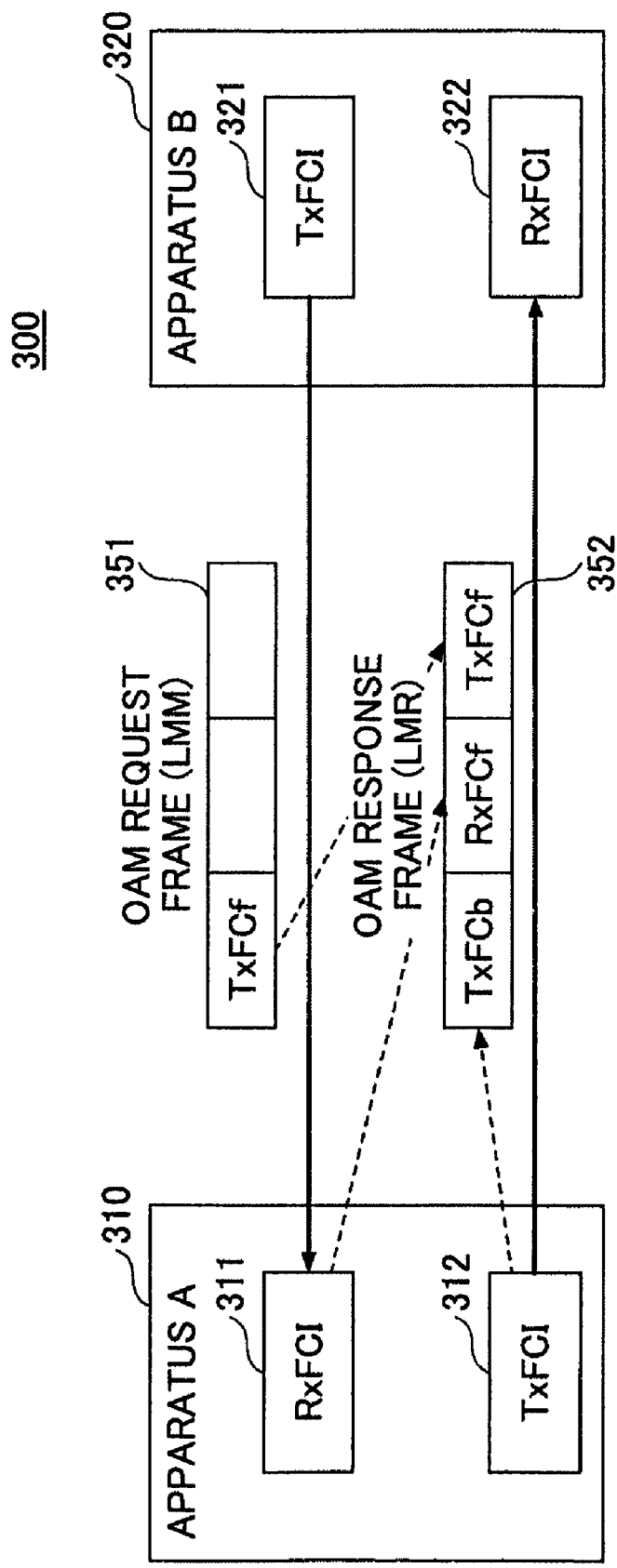
FIG. 3 illustrates single-ended ETH-LM loss measurements.

With reference to FIG. 3, loss measurements in the single-ended ETH-LM are described next. FIG. 3 shows a communications system for performing loss measurements. A communications system 300 illustrated in FIG. 3 includes an apparatus A 310 and an apparatus B 320. Each of the apparatuses A and B 310 and 320 corresponds to the communication apparatus 100 of FIG. 1; however, FIG. 3 shows only frame reception counters 311 and 322 (corresponding to 122 of FIG. 1) and frame transmission counters 312 and 321 (112 of FIG. 1) to make the diagram easier to understand. Assume here that the apparatus B 320 performs loss measurements on the apparatus A 310.

The apparatus B 320 transmits an OAM request frame (LMM) 351 to the apparatus A 310. The OAM frame generating unit (113 of FIG. 1) performs the following series of actions: generating the OAM request frame (LMM) 351; reading the value of the frame transmission counter (TxFCI)

321; setting the read value to TxFCf of the OAM request frame (LMM) 351; and then requesting the frame transmitter circuit (111 of FIG. 1) to transmit the OAM request frame (LMM) 351. In response to the request, the frame transmitter circuit transmits the OAM request frame (LMM) 351.

In the apparatus A 310 after receiving the OAM request frame (LMM) 351, the frame receiving circuit (121 of FIG. 1) stores the value of the frame reception counter (RxFCI) 311 in the LMM RxFCI save memory (124 of FIG. 1), and reports the OAM request frame (LMM) 351 to the OAM frame checking unit (123 of FIG. 1). In response to the report, the OAM frame checking unit requests the OAM frame generating unit (113 of FIG. 1) to generate an OAM response frame (LMR) 352. In response to the request, the OAM frame generating unit performs the following series of actions: generating the OAM response frame 352; reading the value of the frame transmission counter (TxFCI) 312 and setting it to TxFCb; reading the value of the LMM RxFCI save memory (124 of FIG. 1) and setting it to RxFCf; setting the value of TxFCf set in the received OAM request frame (LMM) 351 to TxFCf of the OAM response frame 352; and requesting the frame transmitter circuit (111 of FIG. 1) to transmit the OAM response frame 352. In response to the request, the frame transmitter circuit transmits the OAM response frame (LMR) 352.

In the apparatus B 320 after receiving the OAM response frame (LMR) 352, the frame receiving circuit (121 of FIG. 1) stores the value of the frame reception counter (RxFCI) in the LMR RxFCI save memory (125 of FIG. 1), and reports the OAM response frame (LMR) 352 to the OAM frame checking unit (123 of FIG. 1). In response to the report, the OAM frame checking unit performs loss measurements using the following calculation formulae. Subsequently, the OAM frame checking unit stores TxFCf, TxFCb and RxFCf set in the received OAM response frame (LMR) 352 and the value of the LMR RxFCI save memory (125 of FIG. 1) in the preceding value storing memories (126 through 129 of FIG. 1).

Loss of Other End of Communication (Far-End):

$$|TxFCf(tc) - TxFCf(tp)| - |RxFCf(tc) - RxFCf(tp)|;$$

and

Loss of Itself (Near-End):

$$|TxFCb(tc) - TxFCb(tp)| - |RxFCI(tc) - RxFCI(tp)|,$$

where tc is the value obtained at the time of requesting or responding to the current OAM frame, and tp is the value obtained at the time of requesting or responding to a previous (e.g. the preceding) OAM frame.

As described above, the far-end loss relates to the calculation of the number of data frames sent in the direction from the apparatus transmitting the OAM request frame to the apparatus receiving the OAM request frame. The near-end loss relates to the calculation of the number of data frames sent in the opposite direction.

Since the difference between the current counter value and the preceding counter value is calculated, it is sufficient that each counter only counts the number of transmitted frames or the number of receiving frames.

With reference to FIGS. 4A through 4E, next is described the case in which loss measurements between the apparatuses A and B 310 and 320 of FIG. 3 are performed normally. FIGS. 4A through 4E show, in a temporal sequence, the case in which data frames 1 through 6 are transmitted from the apparatus B 320 to the apparatus A 310, during which the OAM request frame 351 is transmitted from the apparatus B 320 to the apparatus A 310 and the OAM response frame 352 is transmitted from the apparatus A 310 to the apparatus B 320.

FIG. 4A shows that the apparatus B 320 has transmitted no data frame to the apparatus A 310. In both the apparatus A 310 and the apparatus B 320, 0 is set to all the preceding TxFCf storing memory, the preceding RxFCf storing memory, the preceding TxFCb storing memory, the preceding RxFCI storing memory, TxFCI, RxFCI, the LMM RxFCI save memory and the LMM RxFCI save memory in the initial condition.

Figure 4B:
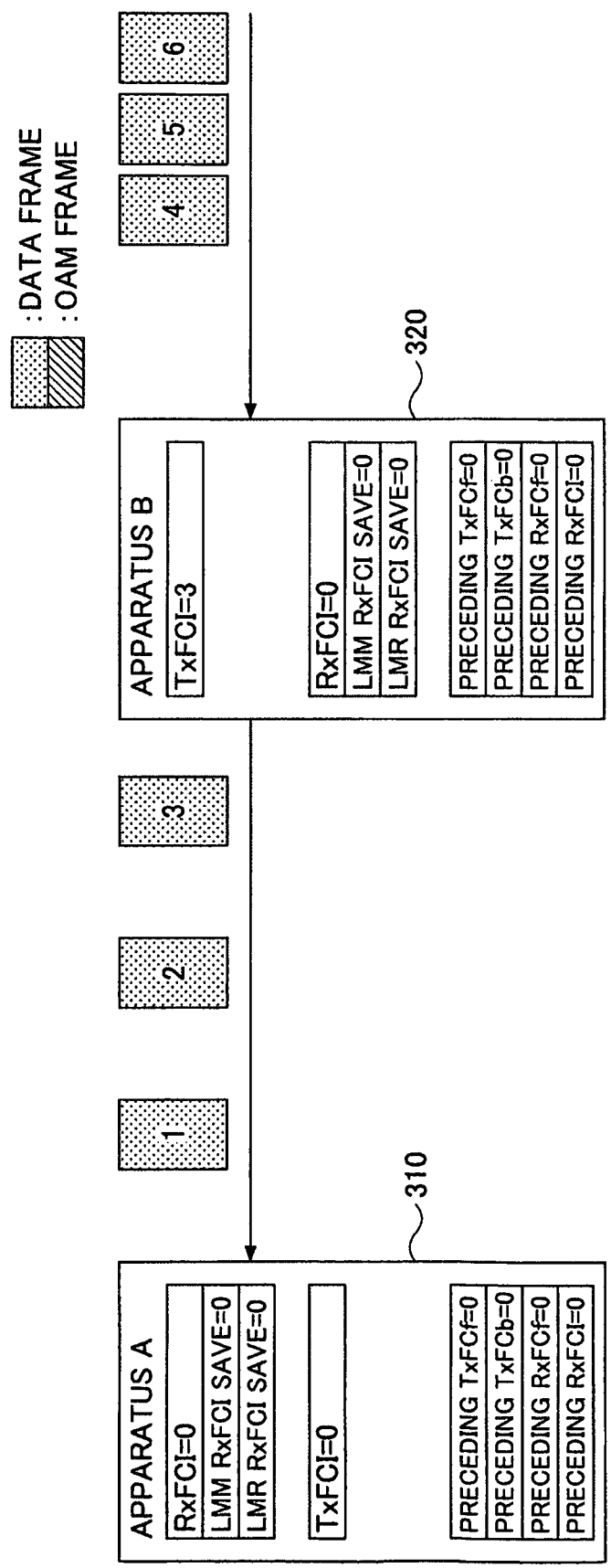

FIG. 4B shows a subsequent condition in which the apparatus B 320 has transmitted the data frames 1 through 3 to the apparatus A 310. The value of TxFCI in the apparatus B 320 has increased to 3.

FIG. 4C shows a subsequent condition in which the apparatus B 320 has transmitted the OAM request frame (LMM) 351 to the apparatus A 310. Assume here that the OAM request frame 351 is inserted between the data frames 3 and 4 without difficulty since there is a time gap between them. Since the value of TxFCI in the apparatus B 320 is 3, TxFCf of the OAM request frame (LMM) 351 is set to 3.

Figure 4D:
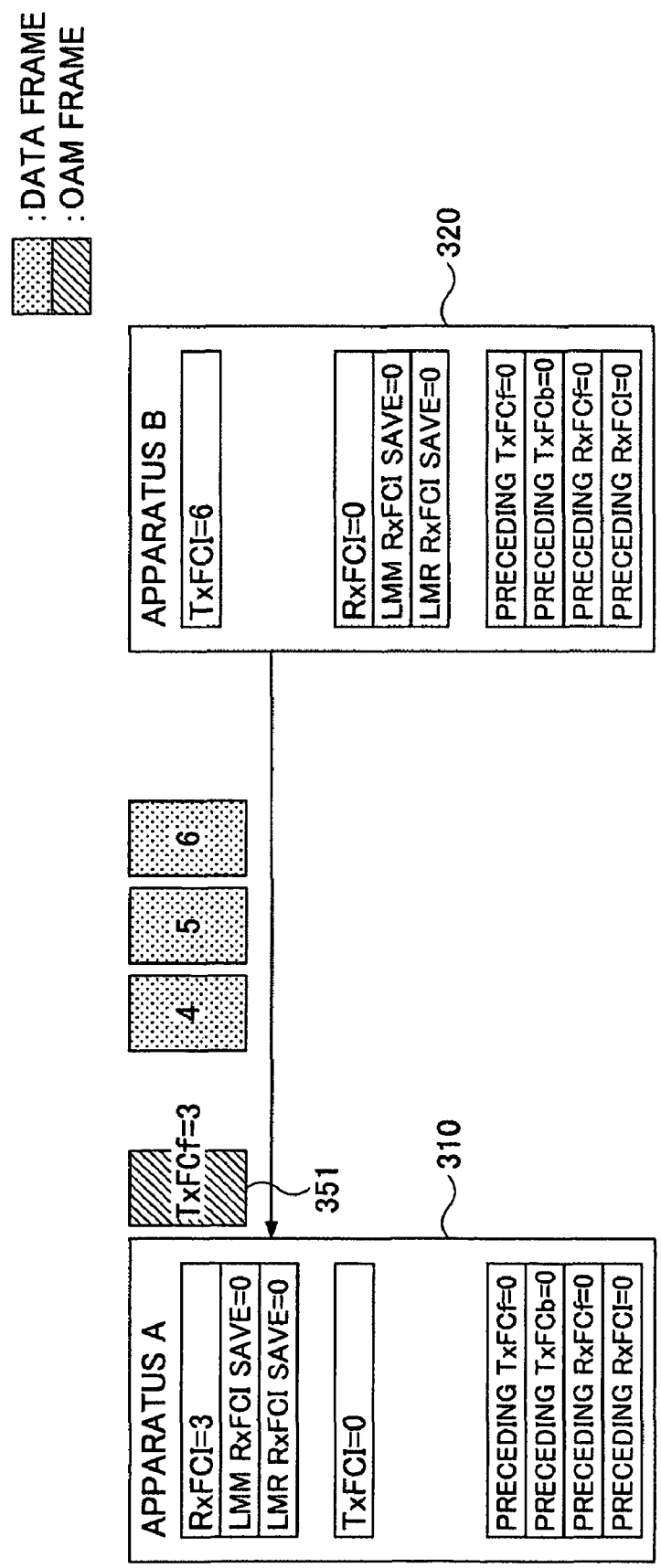

FIG. 4D shows a subsequent condition immediately before the apparatus A 310 receives the OAM request frame (LMM) 351. At this point, since the apparatus A 310 has received the data frames 1 through 3, the value of RxFCI in the apparatus A 310 has been increased to 3. In addition, the apparatus B 320 has transmitted the data frames 4 through 6 after transmitting the OAM request frame (LMM) 351, and therefore, the value of TxFCI in the apparatus B 320 has been increased to 6.

Figure 4E:
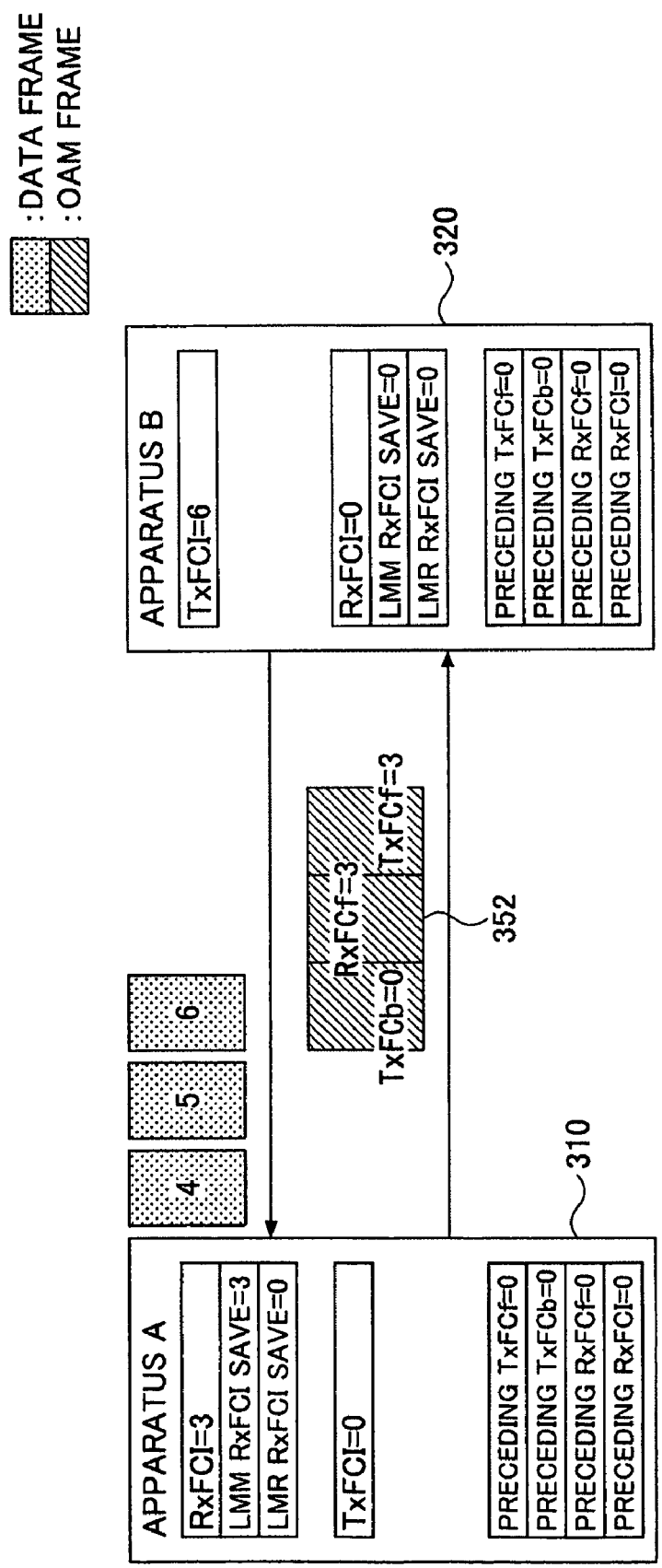

FIG. 4E shows a subsequent condition in which, in response to the reception of the OAM request frame 351, the apparatus A 310 has transmitted the OAM response frame 352. When receiving the OAM request frame (LMM) 351, the apparatus A 310 sets RxFCI to a value of (3) in the LMM RxFCI save memory. TxFCf of the OAM response frame (LMR) 352 is set to 3 since TxFCf of the OAM request frame (LMM) 351 is 3. RxFCf of the OAM response frame (LMR) 352 is set to 3 since the LMM RxFCI save memory of the apparatus A indicates 3. TxFCb of the OAM response frame (LMR) 352 is set to 0 since the value of TxFCI of the apparatus A 310 at the time of transmission of the OAM response frame is 0.

After receiving the OAM request frame (LMR) 352, the apparatus B 320 sets RxFCI to a value of (0) in the LMR RxFCI save memory, and then calculates, at the OAM frame checking unit, the packet loss as follows.

Packet loss of Other End of Communication (Far-end):

$$|TxFCf(tc) - TxFCf(tp)| - |RxFCf(tc) - RxFCf(tp)| =$$
$$|\text{Received } LMR\ TxFCf - \text{Preceding } TxFCf| -$$
$$|\text{Received } LMR\ RxFCf - \text{Preceding } RxFCf| =$$
$$|3 - 0| - |3 - 0| = 0;\text{ and}$$

Packet loss of Itself (Near-end):

$$|TxFCb(tc) - TxFCb(tp)| - |RxFCI(tc) - RxFCI(tp)|, =$$
$$|\text{Received } LMR\ TxFCb - \text{Preceding } TxFCb| -$$
$$|\text{Value in } LMR\ RxFCI \text{ save memory} - \text{Preceding } RxFCI \text{ value}| =$$
$$|0 - 0| - |0 - 0| = 0$$

It can be seen that the calculation of the packet loss is conducted normally since the calculation result is 0 in the case where no packet loss has occurred.

With reference to FIGS. 5A through 5E, next is described the case in which loss measurements between the apparatuses A and B 310 and 320 of FIG. 3 are not performed normally. FIGS. 5A through 5E show, in a temporal sequence, the case in which the data frames 1 through 6 are transmitted from the apparatus B 320 to the apparatus A 310, during which the OAM request frame 351 is transmitted from the apparatus B 320 to the apparatus A 310 and the OAM response frame 352 is transmitted from the apparatus A 310 to the apparatus B 320.

FIG. 5A shows that the apparatus B 320 has transmitted no data frame to the apparatus A 310. In both the apparatus A 310 and the apparatus B 320, 0 is set to all the preceding TxFCf storing memory, the preceding RxFCf storing memory, the preceding TxFCb storing memory, the preceding RxFCl storing memory, TxFCl, RxFCl, the LMM RxFCl save memory and the LMM RxFCl save memory in the initial condition.

FIG. 5B shows a subsequent condition in which the apparatus B 320 has transmitted the data frames 1 through 3 to the apparatus A 310. The value of TxFCl in the apparatus B 320 has increased to 3. The procedure up to this point is the same as that described with reference to FIGS. 4A and 4B.

Figure 5C:
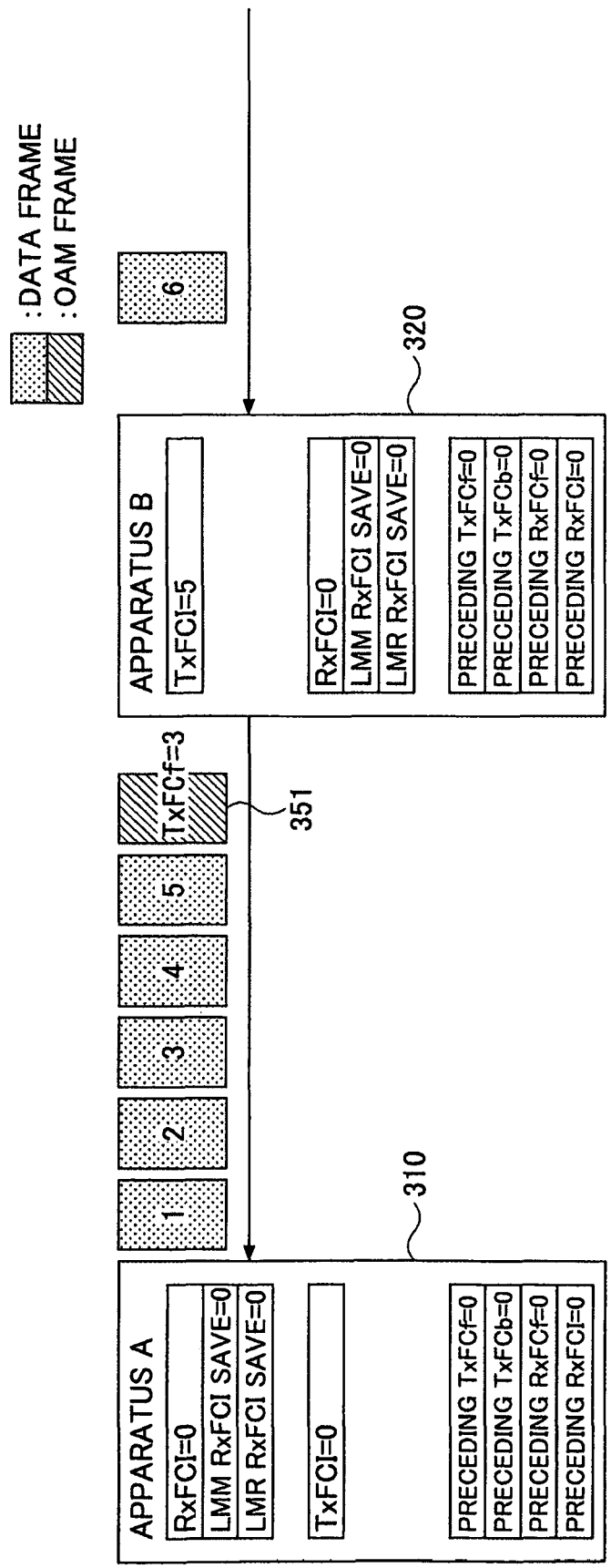
Figure 5E:
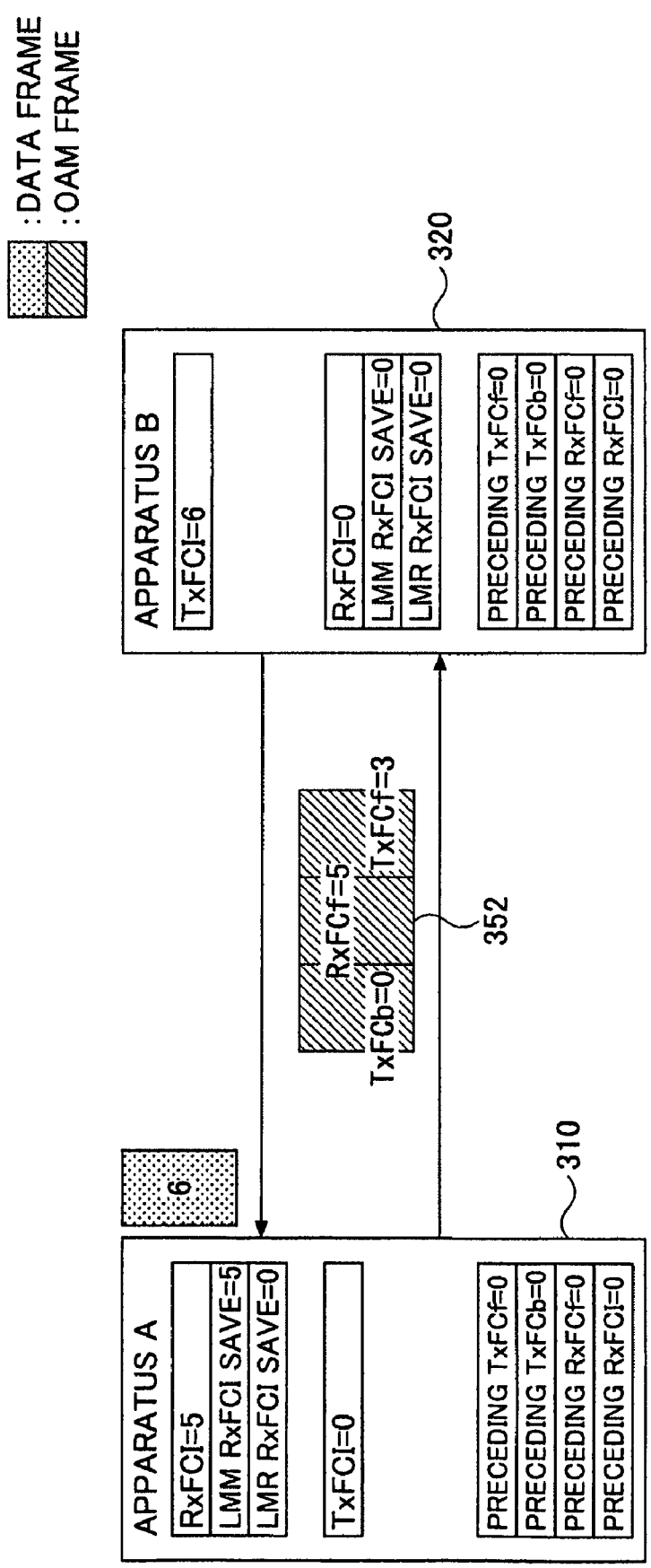

FIG. 5C shows a subsequent condition in which the apparatus B 320 has transmitted the OAM request frame (LMM) 351 to the apparatus A 310. Assume here that there is no time gap between the data frames 3 and 4, and the data frames 4 and 5 are transmitted first and the OAM request frame 351 is then inserted after the data frame 5. In the apparatus B 320, since the value of TxFCl read at the time when the OAM request frame 351 is about to be transmitted is 3, TxFCf of the OAM request frame (LMM) 351 is set to 3. However, when the OAM request frame 351 is transmitted, the data frames 4 and 5 have already been transmitted, and therefore, the value of TxFCl in the apparatus B 320 is increased to 5.

FIG. 5D shows a subsequent condition immediately before the apparatus A 310 receives the OAM request frame (LMM) 351. At this point, since the apparatus A 310 has received the data frames 1 through 5, the value of RxFCl in the apparatus A 310 has been increased to 5. In addition, the apparatus B 320 has transmitted the data frame 6 after transmitting the OAM request frame (LMM) 351, and therefore, the value of TxFCl in the apparatus B 320 has been increased to 6.

FIG. 4E shows a subsequent condition in which, in response to the reception of the OAM request frame 351, the apparatus A 310 has transmitted the OAM response frame 352. When receiving the OAM request frame (LMM) 351, the apparatus A 310 sets RxFCf to a value of (3) in the LMM RxFCl save memory. TxFCf of the OAM response frame (LMR) 352 is set to 3 since TxFCf of the OAM request frame (LMM) 351 is 3. RxFCf of the OAM response frame (LMR) 352 is set to 5 since the LMM RxFCl save memory of the apparatus A indicates 5. TxFCb of the OAM response frame (LMR) 352 is set to 0 since the value of TxFCl of the apparatus A 310 at the time of transmission of the OAM response frame is 0.

After receiving the OAM request frame (LMR) 352, the apparatus B 320 sets RxFCl to a value of (0) in the LMR RxFCl save memory, and then calculates, at the OAM frame checking unit, the packet loss as follows.

Packet loss of Other End of Communication (Far-end):

$$|TxFCf(tc) - TxFCf(tp)| - |RxFCf(tc) - RxFCf(tp)| =$$
$$|\text{Received } LMR \text{ } TxFCf - \text{Preceding } TxFCf| -$$
$$|\text{Received } LMR \text{ } RxFCf - \text{Preceding } RxFCf| =$$
$$|3 - 0| - |5 - 0| = -2; \text{ and}$$

Packet loss of Itself (Near-end):

$$|TxFCb(tc) - TxFCb(tp)| - |RxFCl(tc) - RxFCl(tp)|, =$$
$$|\text{Received } LMR \text{ } TxFCb - \text{Preceding } TxFCb| -$$
$$|\text{Value in } LMR \text{ } RxFCl \text{ save memory} - \text{Preceding } RxFCl \text{ value}| =$$
$$|0 - 0| - |0 - 0| = 0$$

It can be seen that the calculation of the packet loss is not conducted normally since the calculation result of the far-end is not 0 even though no packet loss has occurred.

[Dual-Ended ETH-LM]

Figure 6:
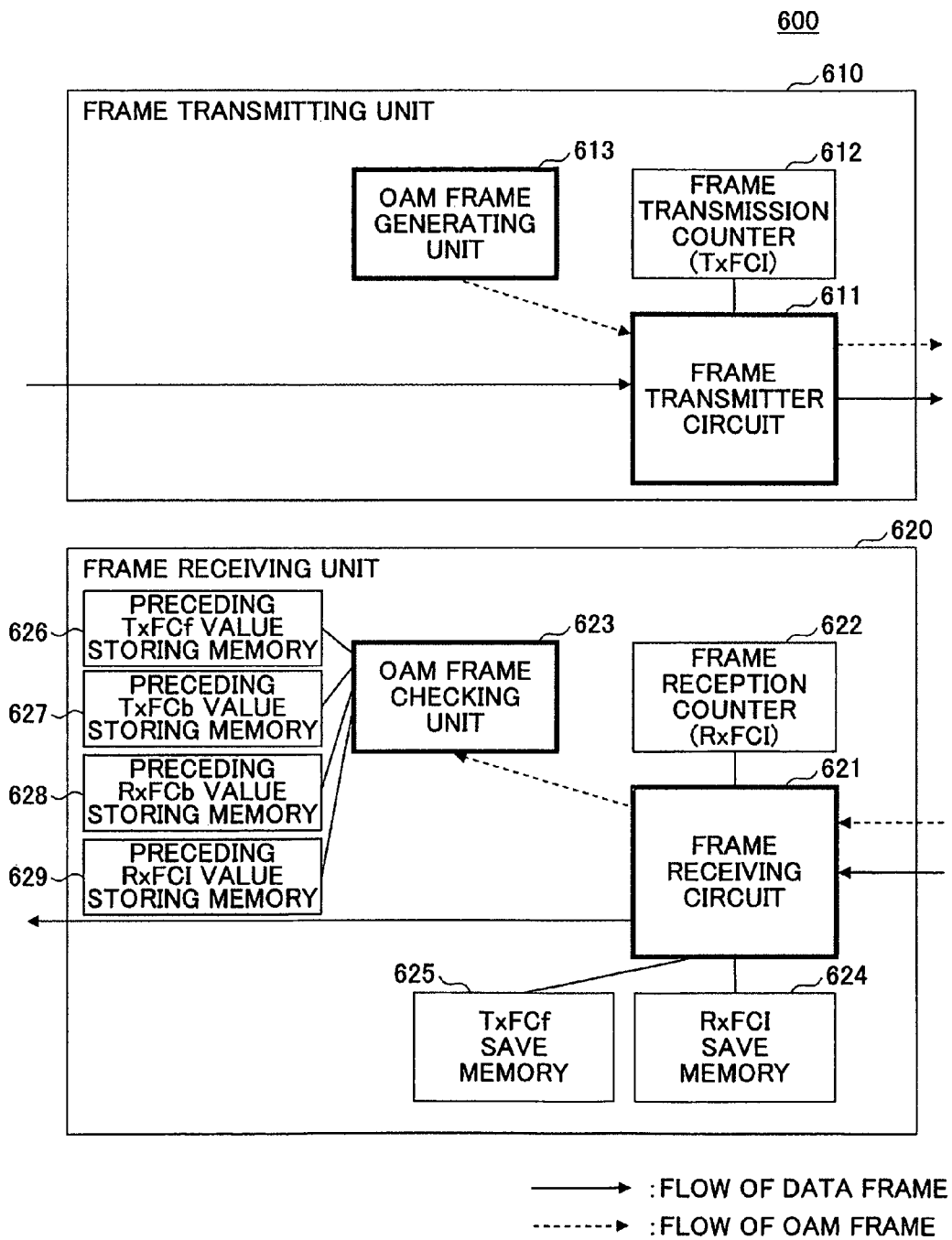
FIG. 6 is a block diagram of a dual-ended communication apparatus complying with Y.1731.

FIG. 6 shows a dual-ended communication apparatus complying with Y.1731. A communication apparatus 600 of FIG. 6 includes a frame transmitting unit 610 for transmitting various frames. The frame transmitting unit 610 includes a frame transmitter circuit 611 for transmitting data frames and OAM frames, which the OAM frames are monitoring and control frames; a frame transmission counter (TxFCl) 612 for counting up at the time of data frame transmission; and an OAM frame generating unit 613 for generating an OAM frame (CCM) in response to reception of an OAM transmission request, and requesting the frame transmitter circuit 611 to transmit the generated OAM frame.

The communication apparatus 600 also includes a frame receiving unit 620 for receiving an input frame. The frame receiving unit 620 includes a frame receiving circuit 621, a frame reception counter 622, and an OAM frame checking unit 623. The frame receiving circuit 621 receives data frames and OAM frames, which the OAM frames are monitoring and control frames. If receiving an OAM frame, the frame receiving circuit 621 stores the value of the frame reception counter (RxFCl) 622 in an RxFCl save memory 624, and also stores TxFCf of the OAM frame in a TxFCf save memory 625. Then, the frame receiving circuit 621 reports the received OAM frame to the OAM frame checking unit 623. The frame reception counter 622 counts up at the time of data frame reception. When receiving an OAM frame, the OAM frame checking unit 623 checks the frame. If it is an OAM frame (CCM), the OAM frame checking unit 623 performs frame loss measurements. The OAM frame checking unit 123 includes memories 626 through 629 that store the preceding TxFCf, the preceding TxFCb, the preceding RxFCb and the preceding RxFCl.

Note that the frame transmission counter (TxFCl) 612 and frame reception counter (RxFCl) 622 of FIG. 6 do not count OAM frames, and count only data frames.

Figure 2C:
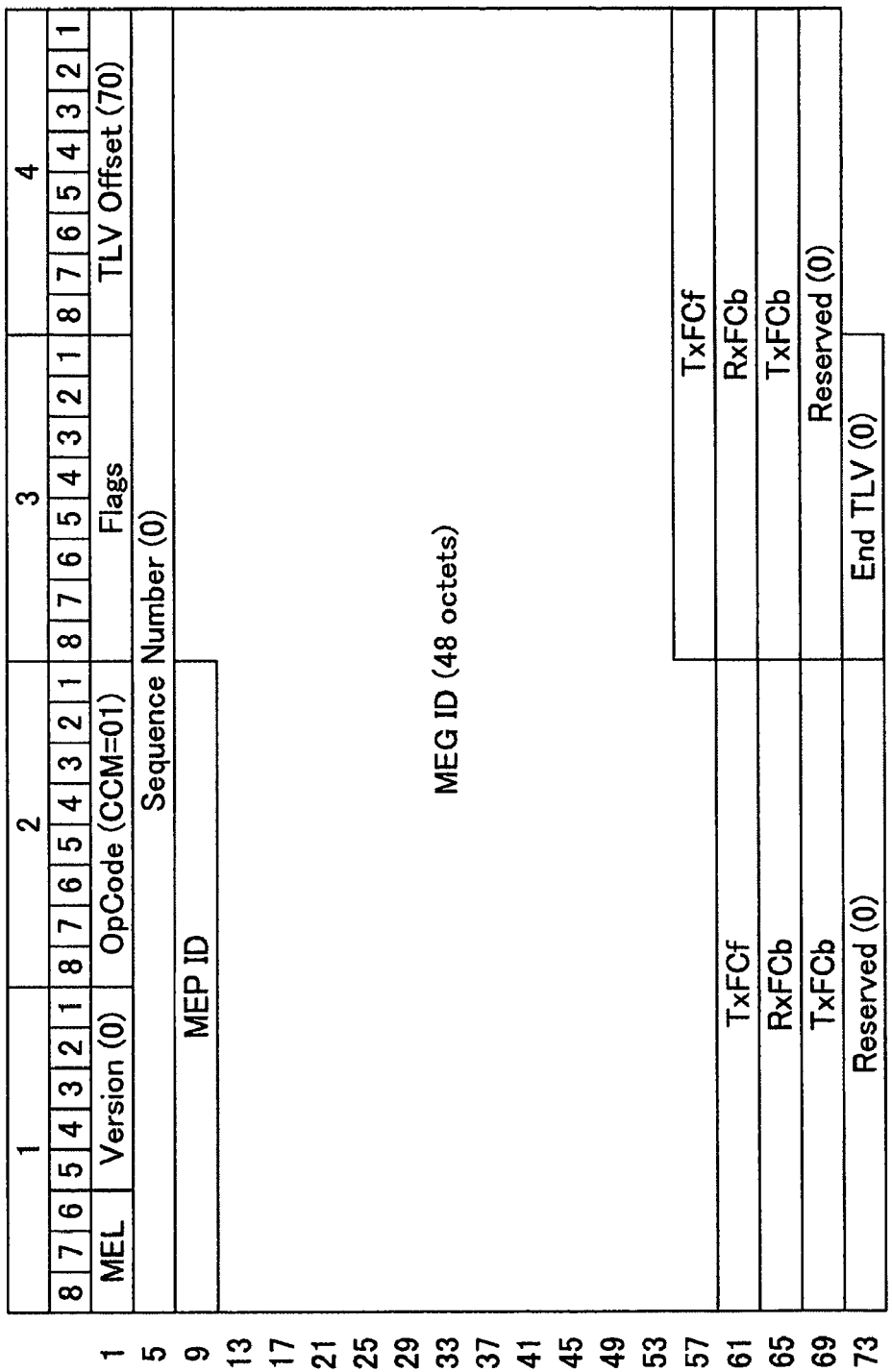

FIG. 2C shows an OAM frame of the dual-ended ETH-LM complying with Y.1731. Only items related to the present embodiment are explained here. In FIG. 2C, "TxFCl" indicates a data frame transmission counter, and "RxFCl" indicates a data frame reception counter. "TxFCf" indicates the value of TxFCl at the time of transmission of an OAM frame (CCM). "RxFCb" is the value of RxFCl obtained when the last OAM frame (CCM) from an apparatus on the other end is received. "TxFCb" is TxFCf included in the last OAM frame (CCM) received from the apparatus on the other end.

Figure 7:
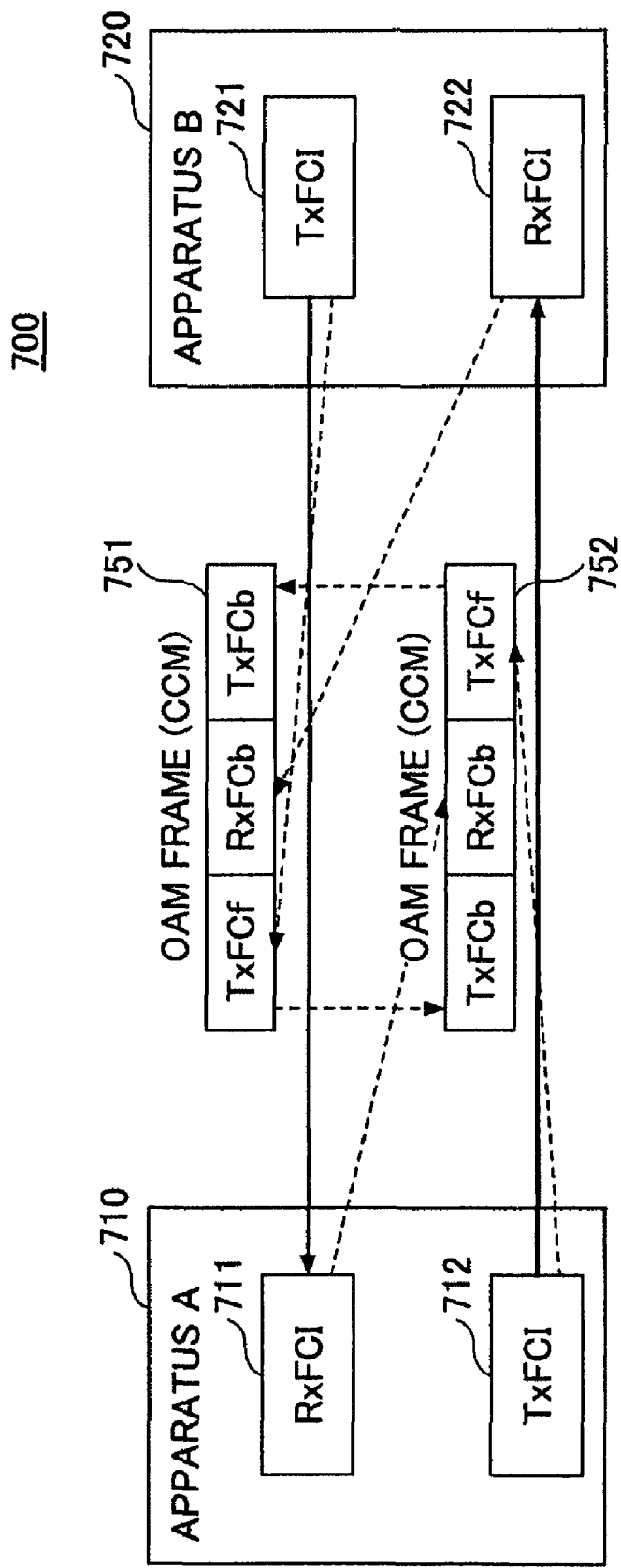
FIG. 7 illustrates dual-ended ETH-LM loss measurements.

With reference to FIG. 7, loss measurements in the dual-ended ETH-LM are described next. FIG. 7 shows a communications system for performing loss measurements. A communications system 700 illustrated in FIG. 7 includes an apparatus A 710 and an apparatus B 720. Each of the apparatuses A and B 710 and 720 corresponds to the communication apparatus 600 of FIG. 6; however, FIG. 7 shows only frame reception counters 711 and 722 (corresponding 622 of FIG. 6) and frame transmission counters 712 and 721 (612 of FIG. 6) to make the diagram easier to understand. Unlike the single-ended ETH-LM in which one of two apparatuses is a communication origin, in the dual-ended ETH-LM, both apparatuses perform loss measurements at the same time by receiving and transmitting CCM frames. Next are described loss measurements performed in the direction from the apparatus B 720 to the apparatus A 710.

The apparatus B 720 transmits an OAM frame (CCM) 751 to the apparatus A 710. In this relation, the OAM frame generating unit (613 of FIG. 6) performs the following series of actions: generating the OAM frame (CCM) 751; reading the value of the frame transmission counter 721 and setting the read value to TxFCf of the OAM frame (CCM) 751; reading the value of the RxFCI save memory (624 of FIG. 6) and setting the read value to RxFCb of the OAM frame 751; reading the value of the TxFCf save memory (625 of FIG. 6) and setting the read value to TxFCb of the OAM frame (CCM) 751; and then requesting the frame transmitter circuit (611 of FIG. 6) to transmit the OAM frame (CCM) 751. In response to the request, the frame transmitter circuit transmits the OAM frame (CCM) 751.

In the apparatus A 710 after receiving the OAM frame (CCM) 751, the frame receiving circuit (621 of FIG. 6) stores the value of the frame reception counter (RxFCI) (622 of FIG. 6) in the RxFCI save memory (624 of FIG. 6) and also stores TxFCF of the received OAM frame (CCM) 751 in the TxFCf save memory (625 of FIG. 6), and reports the OAM frame (CCM) 751 to the OAM frame checking unit (623 of FIG. 6). In response to the report, the OAM frame checking unit (623 of FIG. 6) performs loss measurements using the following calculation formulae. Subsequently, the OAM frame checking unit stores TxFCf, TxFCb and RxFCb set in the received OAM frame (CCM) 751 and the value of the RxFCI save memory in the preceding value storing memories (626 through 629 of FIG. 6).

Loss of Other End of Communication (Far-End):

|TxFCb(tc)−TxFCb(tp)|−|RxFCb(tc)−RxFCb(tp)|;

and

Loss of Itself (Near-End):

|TxFCf(tc)−TxFCf(tp)|−|RxFCI(tc)−RxFCI(tp)|, where tc is the value at the time of requesting or responding to the current OAM frame, and tp is the value obtained at the time of requesting or responding to the preceding OAM frame.

With reference to FIGS. 8A through 8E, next is described the case in which loss measurements between the apparatuses A and B 710 and 720 of FIG. 7 are performed normally. FIGS. 8A through 8E show, in a temporal sequence, the case in which the data frames 1 through 6 are transmitted from the apparatus B 720 to the apparatus A 710, during which the OAM frame 751 is transmitted from the apparatus B 720 to the apparatus A 710.

FIG. 8A shows that the apparatus B 720 has transmitted no data frame to the apparatus A 710. In both the apparatus A 710 and the apparatus B 720, 0 is set to all the preceding TxFCf storing memory, the preceding TxFCf storing memory, the preceding RxFCb storing memory, the preceding TxFCb storing memory, the preceding RxFCI storing memory, TxFCI, RxFCI, the RxFCI save memory and the TxFCf save memory in the initial condition.

FIG. 8B shows a subsequent condition in which the apparatus B 720 has transmitted the data frames 1 through 3 to the apparatus A 710. The value of TxFCI in the apparatus B 720 has increased to 3.

Figure 8C:
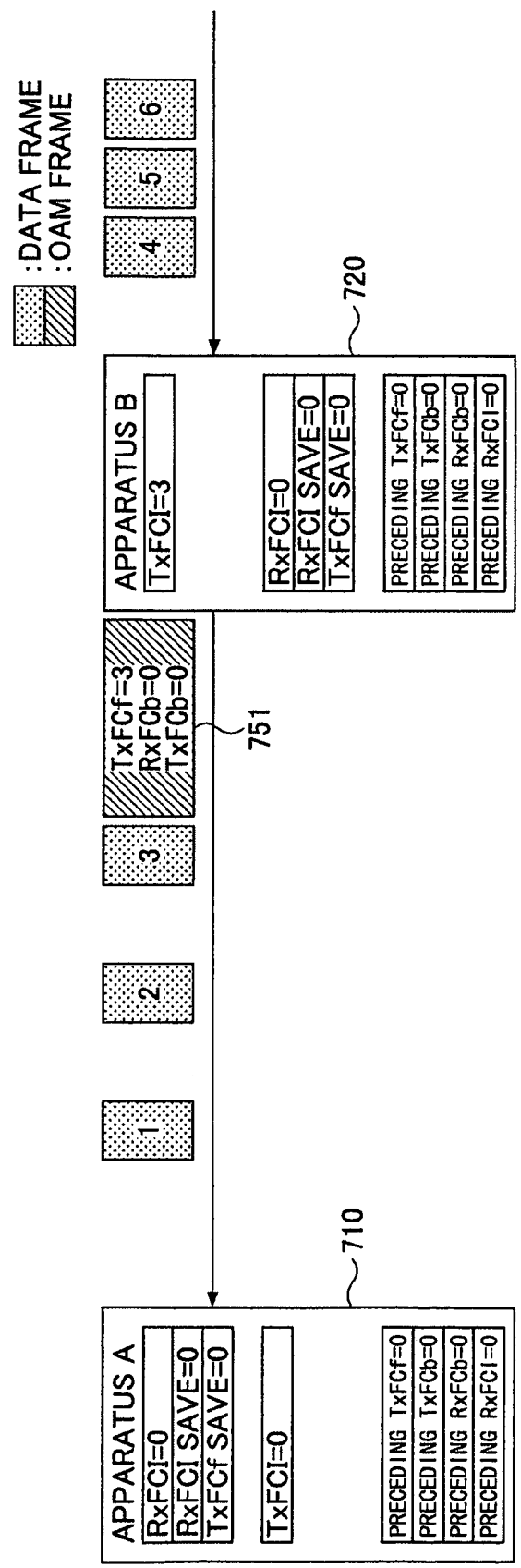

FIG. 8C shows a subsequent condition in which the apparatus B 720 has transmitted the OAM frame (CCM) 751 to the apparatus A 710. Assume here that the OAM frame 751 is inserted between the data frames 3 and 4 without difficulty since there is a time gap between them. Since the value of TxFCI in the apparatus B 720 is 3, TxFCf of the OAM frame (CCM) 751 is set to 3.

Figure 8D:
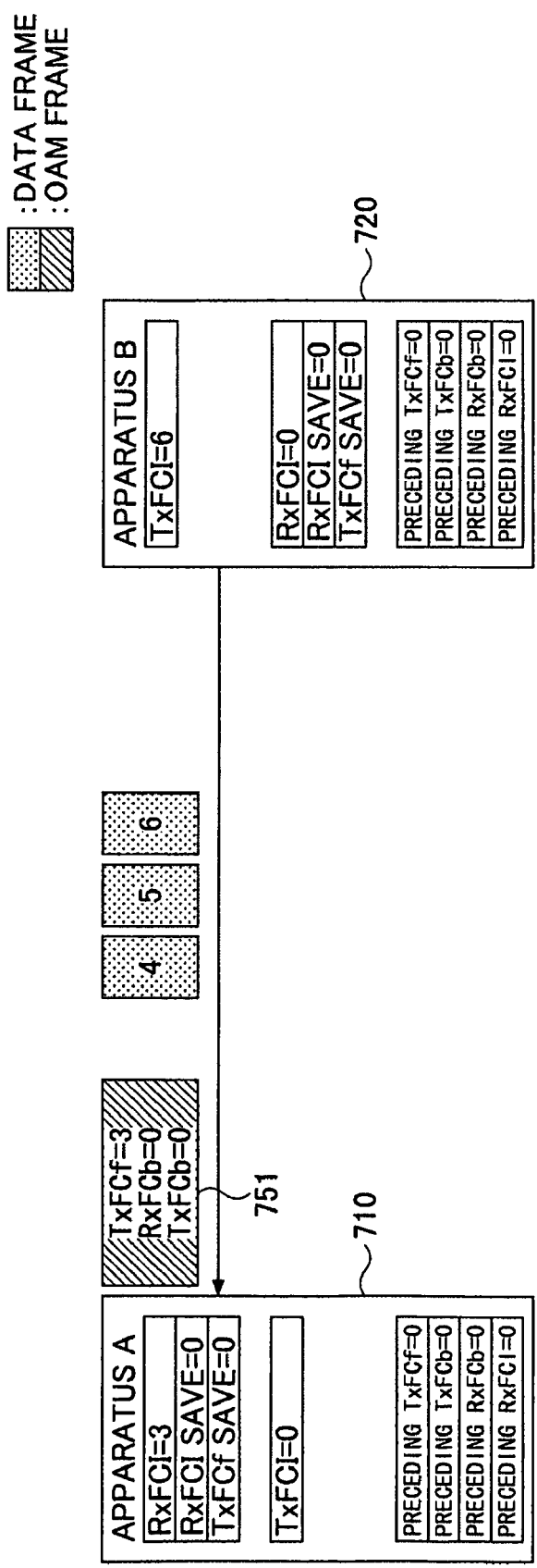

FIG. 8D shows a subsequent condition immediately before the apparatus A 710 receives the OAM frame (CCM) 751. At this point, since the apparatus A 710 has received the data frames 1 through 3, the value of RxFCI in the apparatus A 710 has been increased to 3. In addition, the apparatus B 720 has transmitted the data frames 4 through 6 after transmitting the OAM frame (CCM) 751, and therefore, the value of TxFCI in the apparatus B 720 has been increased to 6.

Figure 8E:
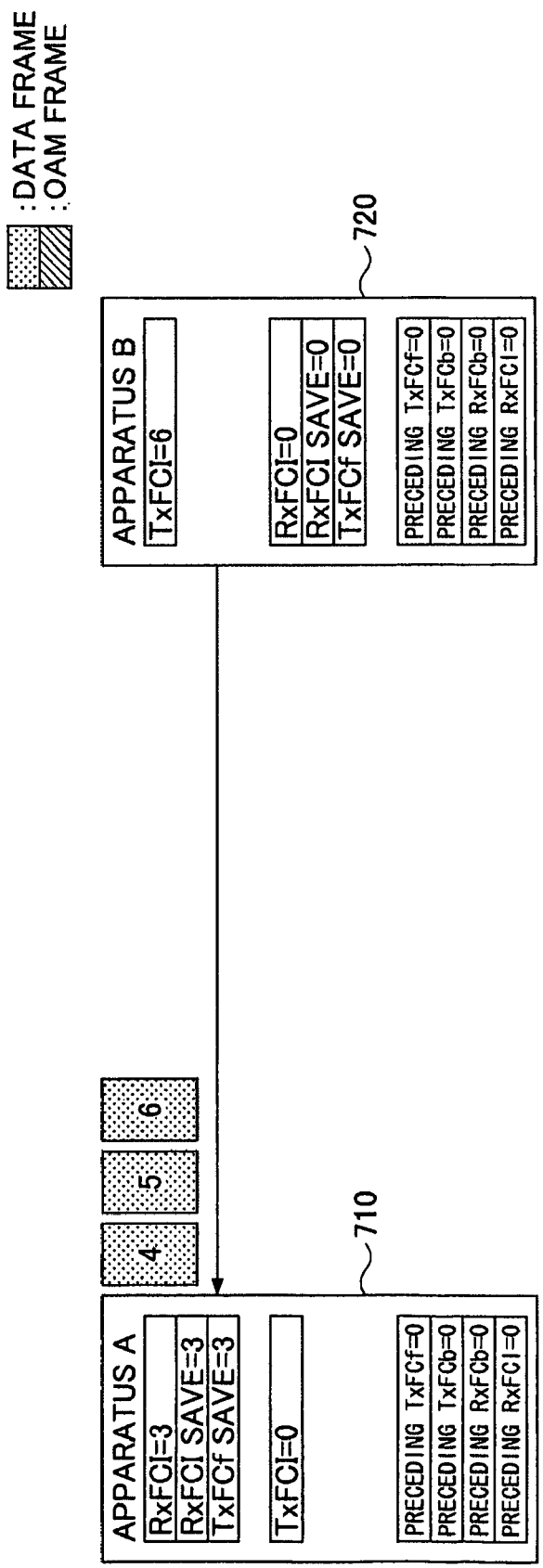

FIG. 8E shows a subsequent condition in which the apparatus A 710 has received the OAM frame 751. When receiving the OAM frame (CCM) 751, the apparatus A 710 sets RxFCI to a value of 3 in the RxFCI save memory. The apparatus A 710 also sets the value (3) to TxFCf of the OAM frame (CCM) 751 in the TxFCf save memory.

After receiving the OAM frame (CCM) 751, the apparatus A 710 calculates, at the OAM frame checking unit, the packet loss as follows.

Loss of Other End of Communication (Far-End):

$$|TxFCb(tc) - TxFCb(tp)| - |RxFCb(tc) - RxFCb(tp)| =$$
$$|\text{Received } CCM\ TxFCb - \text{Preceding } TxFCb| -$$
$$|\text{Received } CCM\ RxFCb - \text{Preceding } RxFCb| =$$
$$|0 - 0| - |0 - 0| = 0;\ \text{and}$$

Loss of Itself (Near-End):

$$|TxFCf(tc) - TxFCf(tp)| - |RxFCI(tc) - RxFCI(tp)| =$$
$$|\text{Received } CCM\ TxFCf - \text{Preceding } TxFCf| -$$
$$|\text{Value in } RxFCI \text{ save memory} - \text{Preceding } RxFCI \text{ value}| =$$
$$|3 - 0| - |3 - 0| = 0$$

It can be seen that the calculation of the packet loss is conducted normally since the calculation result is 0 in the case where no packet loss has occurred.

With reference to FIGS. 9A through 9E, next is described the case in which loss measurements between the apparatuses A and B 710 and 720 of FIG. 7 are not performed normally. FIGS. 9A through 9E show, in a temporal sequence, the case in which the data frames 1 through 6 are transmitted from the apparatus B 720 to the apparatus A 710, during which the OAM frame 751 is transmitted from the apparatus B 720 to the apparatus A 710.

FIG. 9A shows that the apparatus B 720 has transmitted no data frame to the apparatus A 710. In both the apparatus A 710 and the apparatus B 720, 0 is set to all the preceding TxFCf storing memory, the preceding TxFCf storing memory, the preceding RxFCb storing memory, the preceding TxFCb storing memory, the preceding RxFCl storing memory, TxFCI, RxFCI, the RxFCI save memory and the TxFCf save memory in the initial condition.

Figure 9B:
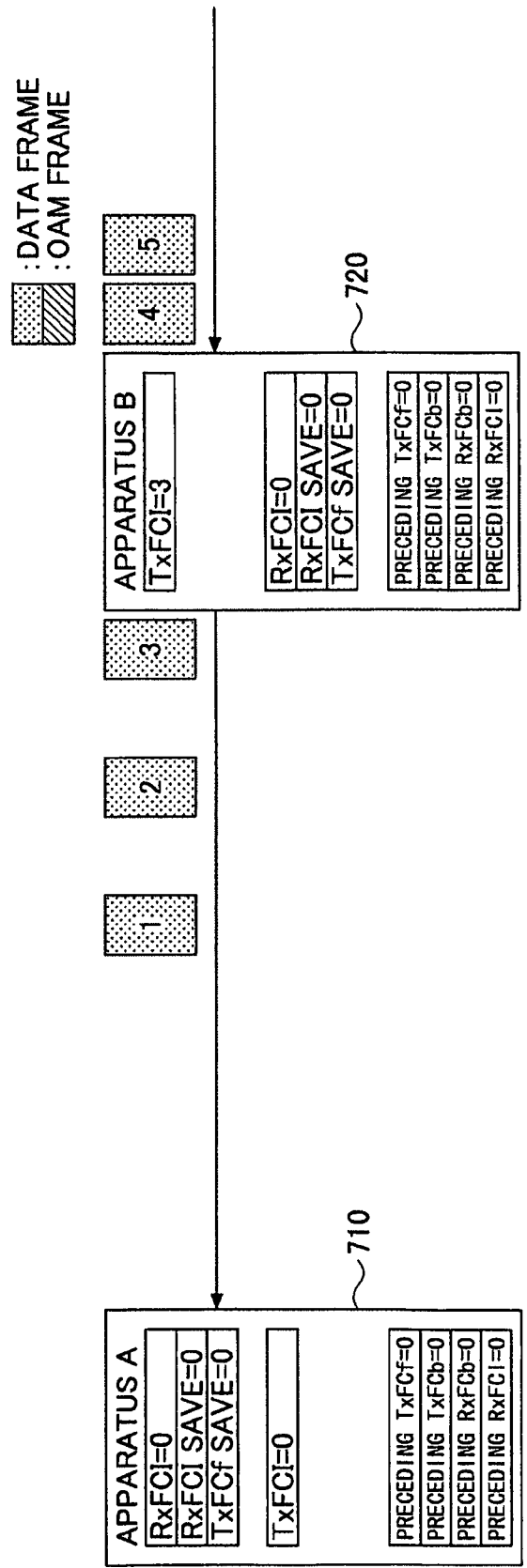

FIG. 9B shows a subsequent condition in which the apparatus B 720 has transmitted the data frames 1 through 3 to the apparatus A 710. The value of TxFCI in the apparatus B 720 has increased to 3. The procedure up to this point is the same as that described with reference to FIGS. 8A and 8B.

Figure 9C:
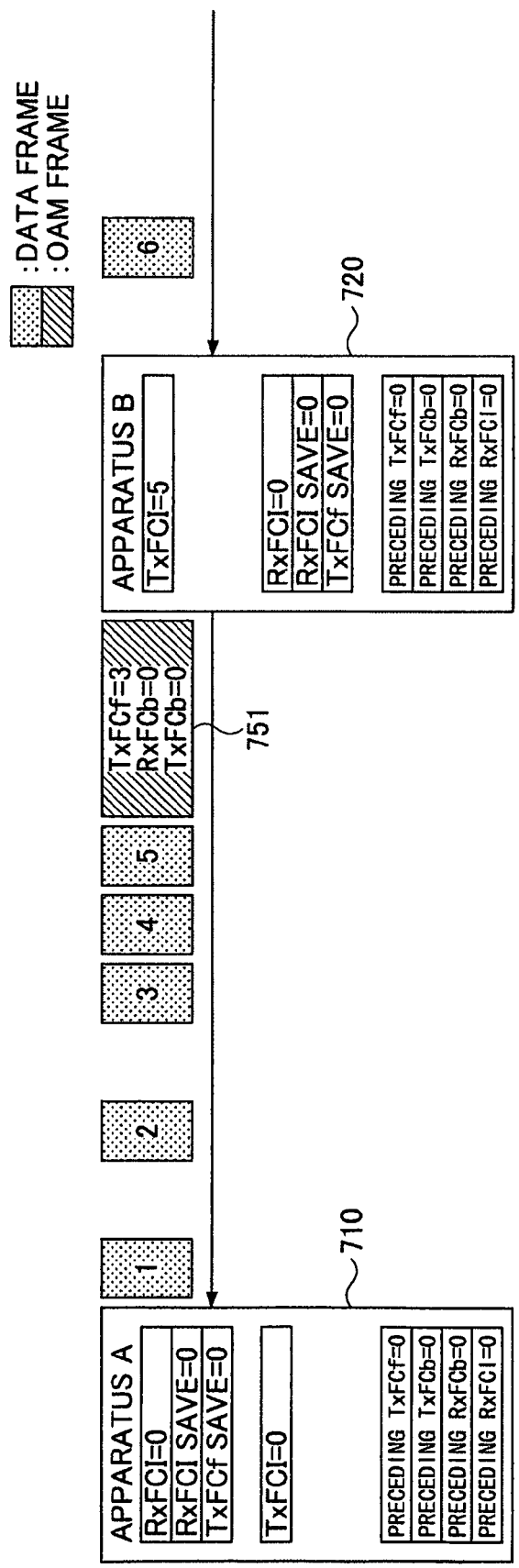

FIG. 9C shows a subsequent condition in which the apparatus B 720 has transmitted the OAM frame (CCM) 751 to the apparatus A 710. Assume here that there is no time gap between the data frames 3 and 4, and the data frames 4 and 5 are transmitted first and the OAM frame 751 is then inserted after the data frame 5. In the apparatus B 720, since the value of TxFCI read at the time when the OAM frame 751 is about to be transmitted is 3, TxFCf of the OAM frame (CCM) 751 is set to 3. However, when the OAM frame 751 is transmitted, the data frames 4 and 5 have already been transmitted, and therefore, the value of TxFCI in the apparatus B 720 is increased to 5.

Figure 9D:
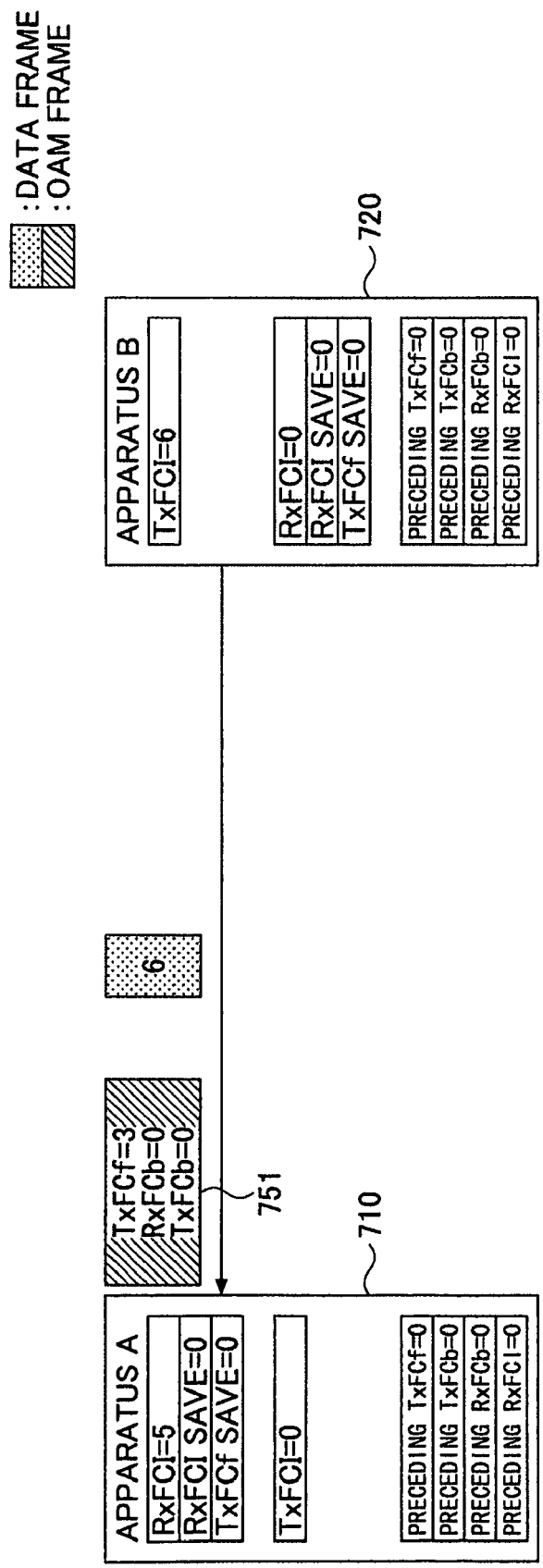

FIG. 9D shows a subsequent condition immediately before the apparatus A 710 receives the OAM frame (CCM) 751. At this point, since the apparatus A 710 has received the data frames 1 through 5, the value of RxFCI in the apparatus A 710 has been increased to 5. In addition, the apparatus B 720 has transmitted the data frame 6 after transmitting the OAM frame (CCM) 751, and therefore, the value of TxFCI in the apparatus B 720 has been increased to 6.

FIG. 9E shows a subsequent condition in which the apparatus A 710 has received the OAM frame 751. When receiving the OAM frame (CCM) 751, the apparatus A 710 sets RxFCI to a value of 5 in the RxFCI save memory. The apparatus A 710 also sets the value (3) to TxFCf of the OAM frame (CCM) 751 in the TxFCf save memory.

Subsequently, the apparatus A 710 calculates, at the OAM frame checking unit, the packet loss as follows. Since the preceding TxFCf save memory, the preceding RxFCb save memory, the preceding TxFCb save memory and the preceding RxFCl save memory are all 0, the following result is obtained.

Loss of Other End of Communication (Far-End):

$$|TxFCb(tc) - TxFCb(tp)| - |RxFCb(tc) - RxFCb(tp)| =$$
$$|\text{Received } CCM \ TxFCb - \text{Preceding } TxFCb| -$$
$$|\text{Received } CCM \ RxFCb - \text{Preceding } RxFCb| =$$
$$|0 - 0| - |0 - 0| = 0; \text{ and}$$

Loss of Itself (Near-End):

$$|TxFCf(tc) - TxFCf(tp)| - |RxFCI(tc) - RxFCI(tp)| =$$
$$|\text{Received } CCM \ TxFCf - \text{Preceding } TxFCf| -$$
$$|\text{Value in } RxFCI \text{ save memory} - \text{Preceding } RxFCI \text{ value}| =$$
$$|3 - 0| - |5 - 0| = -2$$

It can be seen that the calculation of the packet loss is not conducted normally since the calculation result of the near-end is not 0 even though no packet loss has occurred.

As has been described with reference to FIGS. 5A through 5E and FIGS. 9A through 9E, the problem of being unable to calculate packet loss normally needs to be solved.

In order to solve the above problem, one embodiment of the present disclosure schedules the order of frame transmission at the time of transmitting OAM frames (e.g. the OAM request (LMM) frame 351 and the OAM response (LMR) frame 352 of FIG. 5 and the OAM (CCM) frame 751 of FIG. 9), which are monitoring and control frames. Herewith, the value of the data-frame transmission counter at the time of transmission of a generated OAM frame is calculated in advance, and the transmission counter value is corrected by taking into account a change (generally, an increase) in the counter value occurring between the generation and the transmission of the OAM frame. The corrected counter value is stored in the generated OAM frame. That is, the transmission counter value is corrected according to the frame transmission order when an OAM frame is generated.

Figure 10:
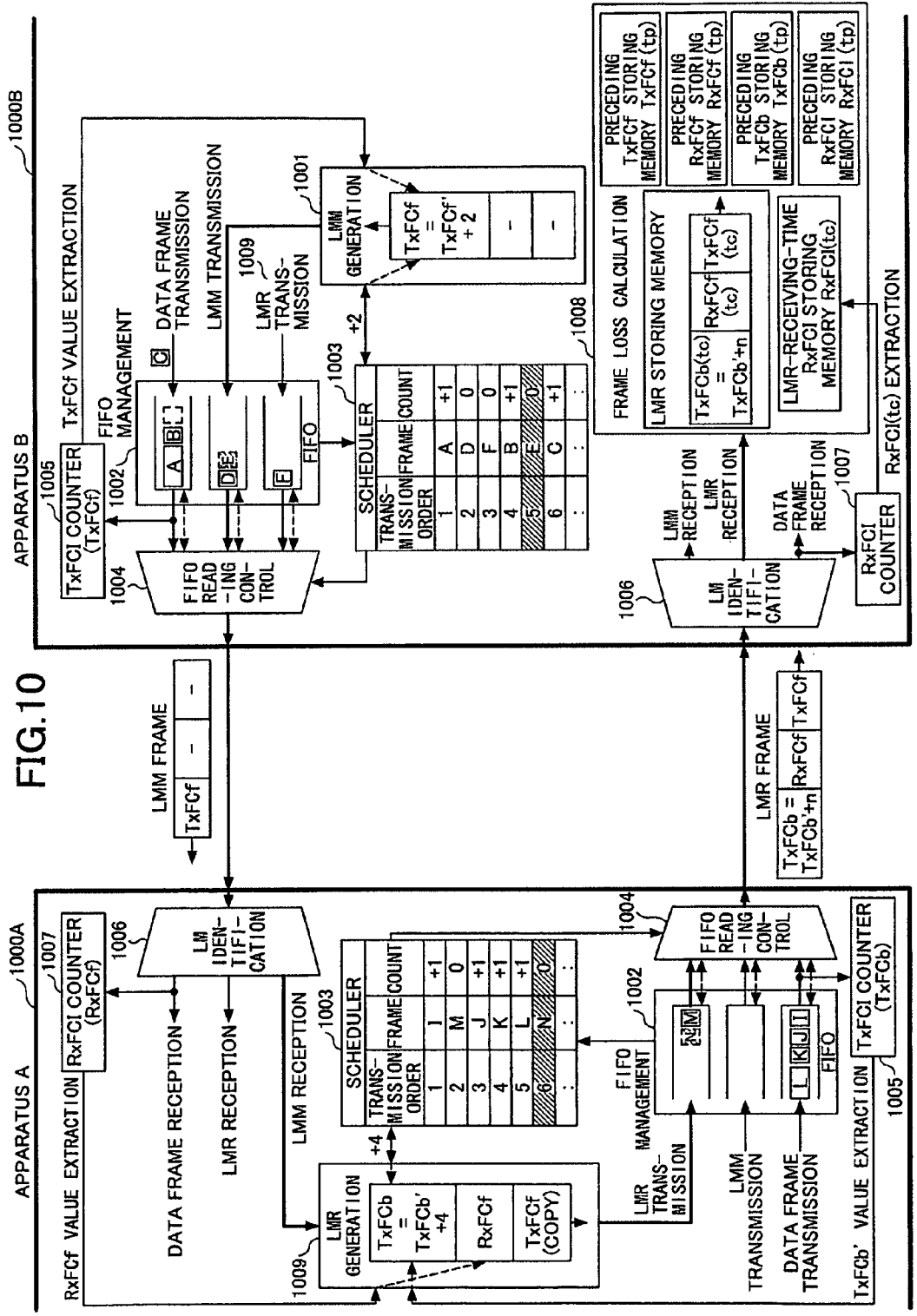
FIG. 10 is a block diagram of single-ended ETH-LM communication apparatuses according to one embodiment.

With reference to FIG. 10, a communication apparatus according to one embodiment is described. FIG. 10 illustrates a single-ended ETH-LM communication apparatus according to one embodiment. FIG. 10 shows a communication apparatus A 1000A and a communication apparatus B 1000B, both of which have basically the same structure. The same reference numerals are given to the components which are common to the communication apparatuses A and B 1000A and 1000B.

FIG. 10 shows the following series of actions: the apparatus B 1000B transmits an OAM request (LMM) frame (hereinafter, referred to also as "LMM frame") to the apparatus A 1000A; in response to receiving the LMM frame, the apparatus A 1000A transmits an OAM response (LMR) frame (also "LMR frame") to the apparatus B 1000B; and after receiving the LMR frame, the apparatus B 1000B calculates frame loss.

The communication apparatus B 1000B (and the communication apparatus A 1000A) of the embodiment includes an LMM generating unit 1001 for generating an LMM frame and an FIFO managing unit 1002 for managing FIFOs, each of which is dedicated to storing one of frame types—data frames, LMM frames and LMR frames—at the time of frame transmission, and storage conditions of frames in the FIFOs. Although different FIFOs are provided for LMM frames and LMR frames according to the present embodiment, a common FIFO may be provided for LMM frames and LMR frames.

The communication apparatus B 1000B also includes a scheduler unit 1003 for determining the frame transmission order according to a transmission algorithm. The scheduler unit 1003 manages and determines the transmission order of various frames stored in the FIFOs of the FIFO managing unit 1002, and also manages change (increase) to be made in the counter value between the generation and the transmission of an LMM frame/an LMR frame.

The communication apparatus B 1000B further includes an FIFO reading control unit 1004 for selecting an FIFO that performs frame transmission in response to an instruction from the scheduler unit 1003; a TxFCI counter 1005 for counting transmission frames, except for OAM frames; and an LM identifying unit 1006 for filtering each frame according to type (data frames, LMMs and LMRs) at the time of frame reception.

The communication apparatus B 1000B further includes an RxFCI counter 1007 for counting received frames (except for OAM frames) and a frame loss calculating unit 1008 for measuring the number of frame losses according to the above calculation formulae. The frame loss calculating unit 1008 includes memories for storing values of TxFCf, RxFCf, TxFCb and RxFCI obtained at the time of receiving the preceding LMR frame, which values are necessary for the frame loss calculation.

The communication apparatus B 1000B includes an LMR generating unit 1009 for generating an LMR frame, although it is not illustrated in FIG. 10.

Although the apparatus A 1000A of the present embodiment has the same structure as that of the apparatus B 1000B, FIG. 10 shows only the LMR generating unit 1009 included in the apparatus A 1000A, while omitting the LMM generating unit 1001 and the frame loss calculating unit 1008 to make the diagram easier to understand.

With reference to FIG. 10, next is described a process flow in which the communication apparatus B 1000B performs frame loss measurements on the communication apparatus A 1000A.

In response to a frame loss measurement request from a higher-level system, the apparatus B 1000B transmits an LMM frame to the apparatus A 1000A. According to one embodiment, the apparatus B 1000B is able to transmit an LMM frame to the apparatus A 1000A at constant intervals (e.g. 100 ms), thereby monitoring the service quality. According to another embodiment, an LMM frame may be transmitted at a predetermined time.

In the apparatus B 1000B, the LMM generating unit 1001 starts to generate an LMM frame. The LMM generating unit 1001 reports the generation of the LMM frame to the scheduler unit 1003. The scheduler unit 1003 determines, according to a transmission order determining algorithm, the transmission order of the LMM frame generated by the LMM generating unit. The transmission order determining algorithm is, for example, a round robin algorithm. According to the round robin algorithm, transmission is performed in the order of data→LMM→LMR→data→ . . . . That is, in the frame transmission, frames to be transmitted are sequentially selected from among multiple FIFOs in turn. The LMM frame generated by the LMM generating unit 1001 is inserted into the position "E" in the middle FIFO of the FIFO management unit 1002. According to another embodiment, the transmission order determining algorithm may be a weighted round robin algorithm or a strict priority algorithm. The transmission order determining algorithm may be selected according to the intended purpose.

The scheduler unit 1003 manages the frame transmission order ("transmission order" in FIG. 10), frames to be transmitted ("frame"), and an increment in the counter value of the TxFCI counter 1005 at the time of transmitting each frame ("count"). For example, the scheduler unit 1003 of the apparatus B 1000B illustrated in FIG. 10 indicates that the first frame to be transmitted is the data frame "A" and the counter value of the TxFCI counter 1005 is increased by "1" when the data frame "A" is transmitted. Similarly, it can be seen that the second frame to be transmitted is the LMM frame "D" and the counter value of the TxFCI counter 1005 is increased by "0" (i.e. is not increased) when the LMM frame "D" is transmitted.

Note that the TxFCI counter 1005 increases the count when a data frame is transmitted but does not increase it when an OAM frame (LLM frame, LMR frame or CCM frame) is transmitted. This is because the TxFCI counter 1005 is designed not to count OAM frames.

The scheduler unit 1003 of the apparatus B 1000B also indicates that the third frame to be transmitted is the LMR frame "F" and the counter value of the TxFCI counter 1005 is increased by "0" (i.e. is not increased) when the LMR frame "F" is transmitted. Similarly, it can be seen that the fourth frame to be transmitted is the data frame "B" and the counter value of the TxFCI counter 1005 is increased by "1" when the data frame "B" is transmitted. Also, the scheduler unit 1003 of the apparatus B 1000B indicates that the fifth frame to be transmitted is the LMM frame "E" and the counter value of the TxFCI counter 1005 is increased by "0" (i.e. is not increased) when the LMM frame "E" is transmitted. Subsequently, a similar procedure will be followed.

The scheduler unit 1003 starts to manage the LMM frame "E" as the fifth frame to be transmitted at the time when the LMM generating unit 1001 reports the start of generating the LMM frame "E". At this point, the LMM generating unit 1001 has not completed the generation of the LMM frame "E", and therefore, the LMM frame "E" has yet to be placed in the LMM transmission FIFO (the middle FIFO) of the FIFO managing unit 1002. That is, the scheduler unit 1003 is capable of determining the transmission order of the LMM frame "E" to be generated according to a report from the LMM generating unit 1001 on the start of LMM frame generation.

The scheduler unit 1003 determines that the data frames "A" and "B" will be transmitted before the LMM frame "E" is transmitted as the fifth frame, and that the counter value of the TxFCI counter 1005 will be increased by "2" (="+1"+"+1"), and then reports it to the LMM generating unit 1001.

The TxFCI counter 1005 reports the current counter value to the LMM generating unit 1001 if it is requested by the LMM generating unit 1001.

The LMM generating unit 1001 adds, to the counter value reported by the TxFCI counter 1005, the increment "+2" in the counter value reported by the scheduler unit 1003, and then inputs, as TxFCf, the corrected counter value to the LMM frame to be generated.

The LMM frame generated by the LMM generating unit 1001 is transmitted to the LMM transmission FIFO (the middle FIFO) of the FIFO managing unit 1002, and stored in the position of the LMM frame "E" (that is, stored as the LMM frame "E").

Receiving an instruction from the scheduler unit 1003, the FIFO reading control unit 1004 reads frames from individual FIFOs of the FIFO managing unit 1002 according to the transmission order managed by the scheduler unit 1003, and transmits the read frames to the apparatus A 1000A.

The LMM frame is transmitted from the apparatus B 1000B to the apparatus A 1000A via a network.

On the other hand, in the apparatus A 1000A, the LM identifying unit 1006 filters (identifies and sorts) frames received from the apparatus B 1000B according to frame type, i.e. data frame, LMM frame and LMR frame. In this example, since the received frame is an LMM frame, it is sent to the LMR generating unit 1009. In the case where the received frame is a data frame, the RxFCI counter 1007 increases the count by one. In the case of an LMR frame, frame loss calculation is performed. The frame loss calculation is the same as that performed by the apparatus B 1000B after receiving an LMR frame from the apparatus A 1000A, described below.

In the apparatus A 1000A, the LMR generating unit 1009 starts to generate an LMR frame in response to the LMM frame transmitted from the LM identifying unit 1006. The LMR generating unit 1009 copies TxFCf of the LMM frame to TxFCf of the LMR frame, and inserts a counter value obtained from the RxFCI counter 1007 into RxFCf at a timing of receiving the LMM frame.

Similar to the scheduler unit of the apparatus B 1000B, when the scheduler unit 1003 of the apparatus A 1000A receives a report on the LMR frame generation from the LMR generating unit 1009, the scheduler unit 1003 determines, according to a transmission algorithm, the transmission order of the LMR frame to be generated. In the present embodiment, the transmission order determining algorithm is a round robin algorithm. The LMR frame generated by the LMR generating unit 1009 is inserted into the position "N" in an LMR transmission FIFO (the top frame) of the FIFO management unit 1002. According to another embodiment, the transmission order determining algorithm may be a weighted round robin algorithm or a strict priority algorithm. The transmission order determining algorithm may be selected according to the intended purpose.

The scheduler unit 1003 manages the frame transmission order ("transmission order"), frames to be transmitted ("frame"), and an increment in the counter value of the TxFCI counter 1005 at the time of transmitting each frame ("count"). For example, the scheduler unit 1003 of the apparatus A 1000A illustrated in FIG. 10 indicates that the first frame to be transmitted is the data frame "I" and the counter value of the TxFCI counter 1005 is increased by "1" when the data frame "I" is transmitted. Similarly, it can be seen that the second frame to be transmitted is the LMR frame "M" and the counter value of the TxFCI counter 1005 is increased by "0" (i.e. is not increased) when the LMR frame "M" is transmitted. Note that the TxFCI counter 1005 increases the count when a data frame is transmitted but does not increase it when an OAM frame (LLM frame, LMR frame or CCM frame) is transmitted. This is because the TxFCI counter 1005 is designed not to count OAM frames.

The scheduler unit 1003 of the apparatus A 1000A also indicates that the third frame to be transmitted is the data frame "J" and the counter value of the TxFCI counter 1005 is increased by "1" when the data frame "J" is transmitted. Similarly, it can be seen that the fourth frame to be transmitted is the data frame "K" and the counter value of the TxFCI counter 1005 is increased by "1" when the data frame "K" is transmitted. Also, the scheduler unit 1003 of the apparatus A 1000A indicates that the fifth frame to be transmitted is the data frame "L" and the counter value of the TxFCI counter 1005 is increased by "1" when the data frame "L" is transmitted. Similarly, the sixth frame to be transmitted is the LMR frame "N" and the counter value of the TxFCI counter 1005 is increased by "0" (i.e. is not increased) when the LMR frame "N" is transmitted. Subsequently, a similar procedure will be followed.

The scheduler unit 1003 starts to manage the LMR frame "N" as the sixth frame to be transmitted at the time when the LMR generating unit 1009 reports the start of generating the LMR frame "N". At this point, the LMR generating unit 1009 has not completed the generation of the LMR frame "N", and therefore, the LMR frame "N" has yet to be placed in the LMR transmission FIFO (the top FIFO) of the FIFO managing unit 1002. That is, the scheduler unit 1003 is capable of determining the transmission order of the LMR frame "N" to be generated according to a report from the LMR generating unit 1009 on the start of LMR frame generation.

The scheduler unit 1003 determines that the data frames "I", "J", "K" and "L" will be transmitted before the LMR frame "N" is transmitted as the sixth frame, and that the counter value of the TxFCI counter 1005 will be increased by "4" (="+1"+"+1"+"+1"+"+1"), and then reports it to the LMR generating unit 1009.

The TxFCI counter 1005 reports the current counter value to the LMM generating unit 1001 if it is requested by the LMR generating unit 1009.

The LMR generating unit 1009 adds, to the counter value reported by the TxFCI counter 1005, the increment "+4" in the counter value reported by the scheduler unit 1003, and then inputs, as TxFCb, the corrected counter value to the LMR frame to be generated.

The LMR frame generated by the LMR generating unit 1009 is transmitted to the LMR transmission FIFO (the top FIFO) of the FIFO managing unit 1002, and stored in the position of the LMR frame "N" (that is, stored as the LMR frame "N").

Receiving an instruction from the scheduler unit 1003, the FIFO reading control unit 1004 reads frames from individual FIFOs of the FIFO managing unit 1002 according to the transmission order managed by the scheduler unit 1003, and transmits the read frames to the apparatus B 1000B.

The LMR frame is transmitted from the apparatus A 1000A to the apparatus B 1000B via a network.

On the other hand, in the apparatus B 1000B, the LM identifying unit 1006 filters (identifies and sorts) frames received from the apparatus A 1000A according to frame type, i.e. data frame, LMM frame and LMR frame. In this example, since the received frame is an LMR frame, frame loss calculation is performed. In the case where the received frame is a data frame, the RxFCI counter 1007 increases the count by one and the counter value is stored in an LMR-receiving-time RxFCI storing memory RxFCI(tc) of the frame loss calculating unit 1008. The preceding RxFCI(tc) value is stored in the preceding RxFCI storing memory RxFCI(tp). In the case of an LMM frame, a procedure of generating an LMR frame is started, similarly to the case in which the apparatus A 1000A receives an LMM frame from the apparatus B 1000B, as described above.

Using the above-mentioned calculation formulae, the frame loss calculating unit 1008 of the apparatus B 1000B calculates frame losses of the other end of communication (far-end) and itself (near-end) based on TxFCf(tc), RxFCf(tc) and TxFCb(tc) of the LMR frame received from the apparatus A 1000A; the counter value RxFCI(tc) obtained from the RxFCI counter 1007 at a timing of receiving the LMR frame; and the preceding LMR-frame values TxFCf(tp), RxFCf(tp), TxFCb(tp) and RxFCI(tp) stored in the memories.

In the above embodiment, the LMM generating unit 1001 and/or the LMR generating unit 1009 receives the counter value of the TxFCI counter 1005, and also receives the increment in the counter value from the scheduler unit 1003. According to another embodiment, the scheduler unit 1003 may receive the counter value of the TxFCI counter 1005, correct the counter value by adding the increment, and then transmit the corrected counter value to the LMM generating unit 1001 and/or the LMR generating unit 1009.

According to the above-described structure, the single-ended ETH-LM communication apparatus of the present embodiment is capable of setting, in an OAM frame, a counter value regarding data frames true and correct at the time of transmission of the OAM frame.

Figure 11:
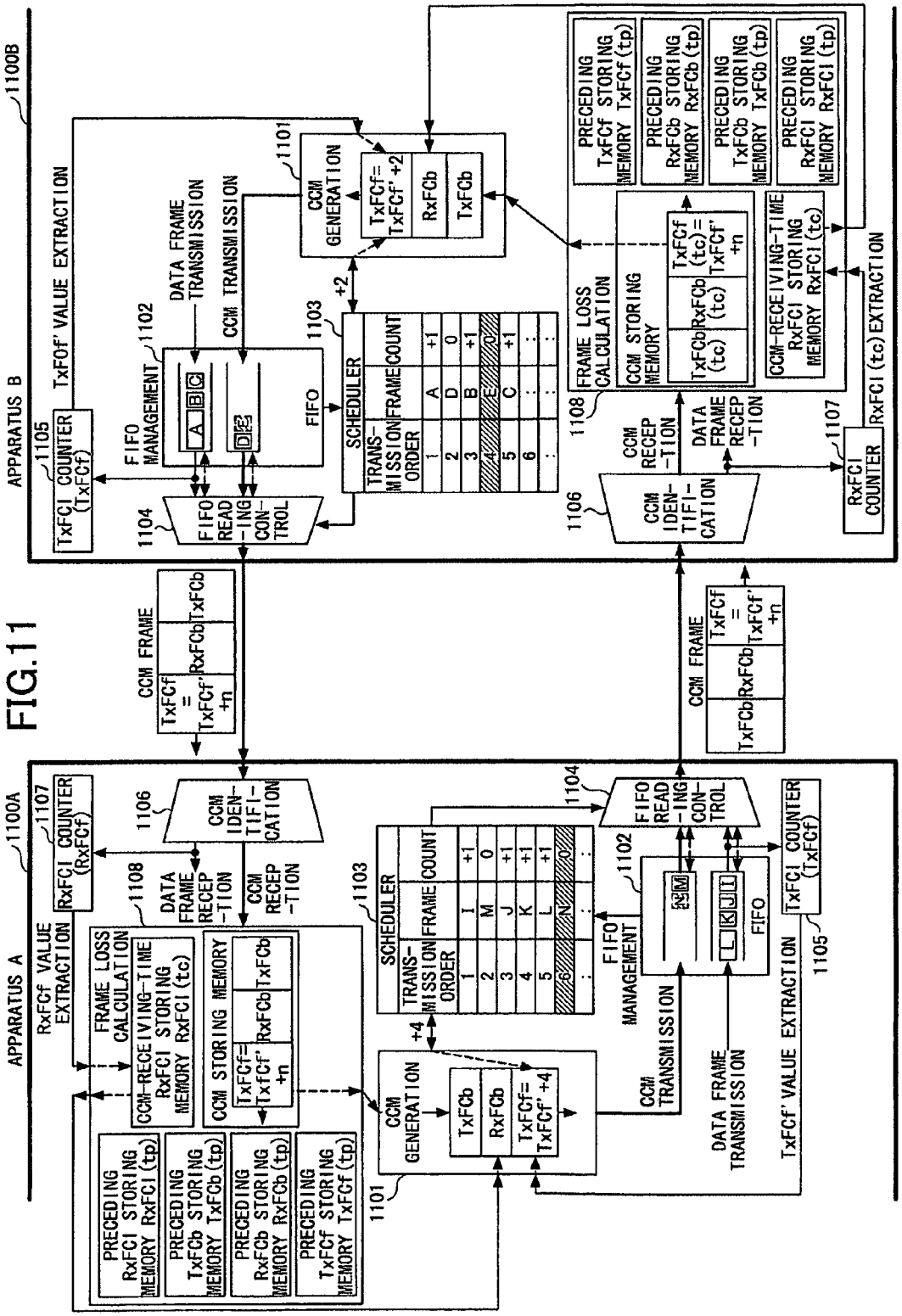
FIG. 11 is a block diagram of dual-ended ETH-LM communication apparatuses according to one embodiment.

With reference to FIG. 11, a communication apparatus according to another embodiment is described. FIG. 11 illustrates a double-ended ETH-LM communication apparatus according to one embodiment. FIG. 11 shows a communication apparatus A 1100A and a communication apparatus B 1100B, both of which have basically the same structure. The same reference numerals are given to the components which are common to the communication apparatuses A and B 1100A and 1100B.

FIG. 11 shows the following series of actions: the apparatus B 1100B transmits an OAM (CCM) frame (hereinafter, referred to as "CCM frame") to the apparatus A 1100A; in response to receiving the CCM frame, the apparatus A 1100A calculates frame losses and also transmits a CCM frame to the apparatus B 1100B; and after receiving the CCM frame, the apparatus B 1100B calculates frame losses.

The communication apparatus B 1100B (and the communication apparatus A 1100A) of the present embodiment includes a CCM generating unit 1101 for generating a CCM frame; an FIFO managing unit 1102 which includes FIFOs, each of which is dedicated to storing either one of data frames and CCM frames at the time of frame transmission, and manages storage conditions of frames in the FIFOs; and a scheduler unit 1103 for determining the frame transmission order according to a transmission algorithm. The scheduler unit 1103 determines the transmission order of various frames stored in the FIFOs of the FIFO managing unit 1102 and manages the frame transmission, and also manages change (increase) to be made in the counter value between the generation and the transmission of a CCM frame.

The communication apparatus B 1100B further includes an FIFO reading control unit 1104 for selecting an FIFO that performs frame transmission in response to an instruction from the scheduler unit 1103; a TxFCI counter 1105 for counting transmission frames, except for OAM frames; a CCM identifying unit 1106 for filtering each frame according to type (data frames and OAM frames) at the time of frame reception; and an RxFCI counter 1107 for counting received frames, except for OAM frames.

The communication apparatus B 1100B further includes a frame loss calculating unit 1108 for measuring the number of frame losses according to the above calculation formulae. The frame loss calculating unit 1108 includes memories for storing values of TxFCf, RxFCb, TxFCb and RxFCI obtained at the time of receiving the preceding CCM frame, which values are necessary for the frame loss calculation.

With reference to FIG. 11, next is described a process flow in which the communication apparatus A 1100A performs frame loss measurements on the communication apparatus B 1100B. In the dual-ended ETH-LM, both the apparatuses perform frame loss measurements at the same time by transmitting and receiving CCM frames, and therefore, no matter whether the apparatus B 1000B performs frame loss measurements on the apparatus A 1100A or the apparatus A 1100A performs frame loss measurements on the apparatus B 1100B, their processes are equivalent.

Next are described loss measurements performed in the direction from the apparatus A 1100A to the apparatus B 1100B.

In response to a frame loss measurement request from a higher-level system, the apparatus A 1100A transmits a CCM frame to the apparatus B 1100B. According to one embodiment, the apparatus A 1100A is able to transmit a CCM frame to the apparatus B 1100B at constant intervals (e.g. 100 ms), thereby monitoring the service quality. According to another embodiment, a CCM frame may be transmitted at a predetermined time.

In the apparatus A 1100A, the CCM generating unit 1101 starts to generate a CCM frame. Since the reception section of the apparatus A 1100A holds TxFCf included in the last CCM frame received from the apparatus B 1100B and the value of the RxFCI counter 1107 obtained at the time of receiving the last CCM frame, these values are inserted as TxFCb and RxFCb into the CCM frame to be generated. The CCM generating unit 1101 reports the generation of the CCM frame to the scheduler unit 1103. The scheduler unit 1103 determines, according to a transmission order determining algorithm, the transmission order of the CCM frame. The transmission order determining algorithm is, for example, a round robin algorithm. According to the round robin algorithm, transmission is performed in the order of data→CCM→data→ . . . . The CCM frame generated by the CCM generating unit 1101 is inserted into the position "N" in the CCM transmission FIFO located at the top in the FIFO management unit 1102. According to another embodiment, the transmission order determining algorithm may be a weighted round robin algorithm or a strict priority algorithm. The transmission order determining algorithm may be selected according to the intended purpose.

The scheduler unit 1103 manages the frame transmission order ("transmission order"), frames to be transmitted ("frame"), and an increment in the counter value of the TxFCI counter 1105 at the time of transmitting each frame ("count"). For example, the scheduler unit 1103 of the apparatus A 1100A illustrated in FIG. 11 indicates that the first frame to be transmitted is the data frame "I" and the counter value of the TxFCI counter 1105 is increased by "1" when the data frame "I" is transmitted. Similarly, it can be seen that the second frame to be transmitted is the CCM frame "M" and the counter value of the TxFCI counter 1105 is increased by "0" (i.e. is not increased) when the CCM frame "M" is transmitted. Note that the TxFCI counter 1105 increases the count when a data frame is transmitted but does not increase it when an OAM frame (CCM frame, in this case) is transmitted.

The scheduler unit 1103 of the apparatus A 1100A also indicates that the third frame to be transmitted is the data frame "J" and the counter value of the TxFCI counter 1105 is increased by "1" when the data frame "J" is transmitted. Similarly, it can be seen that the fourth frame to be transmitted is the data frame "K" and the counter value of the TxFCI counter 1105 is increased by "1" when the data frame "K" is transmitted. Also, the scheduler unit 1003 of the apparatus A 1000A indicates that the fifth frame to be transmitted is the data frame "L" and the counter value of the TxFCI counter 1005 is increased by "1" when the LMM frame "L" is transmitted. Similarly, the sixth frame to be transmitted is the CCM frame "N" and the counter value of the TxFCI counter 1005 is increased by "0" (i.e. is not increased) when the CCM frame "N" is transmitted. Subsequently, a similar procedure will be followed.

The scheduler unit 1103 starts to manage the CCM frame "N" as the sixth frame to be transmitted at the time when the CCM generating unit 1101 reports the start of generating the CCM frame "N". At this point, the CCM generating unit 1101 has not completed the generation of the CCM frame "N", and therefore, the CCM frame "N" has yet to be placed in the CCM transmission FIFO (the upper FIFO) of the FIFO managing unit 1102. That is, the scheduler unit 1103 is capable of determining the transmission order of the CCM frame "N" to be generated according to a report from the CCM generating unit 1101 on the start of CCM frame generation.

The scheduler unit 1103 determines that the data frames "I", "J", "K" and "L" will be transmitted before the CCM frame "N" is transmitted as the sixth frame, and that the counter value of the TxFCI counter 1105 will be increased by "4" (="+1"+"+1"+"+1"+"+1"), and then reports it to the CCM generating unit 1101.

The TxFCI counter 1105 reports the current counter value to the CCM generating unit 1101 if it is requested by the CCM generating unit 1101.

The CCM generating unit 1101 adds, to the counter value reported by the TxFCI counter 1105, the increment "+4" in the counter value reported by the scheduler unit 1103, and then inputs, as TxFCf, the corrected counter value to the CCM frame to be generated.

The CCM frame generated by the CCM generating unit 1101 is transmitted to the CCM transmission FIFO (the upper FIFO) of the FIFO managing unit 1102, and stored in the position of the CCM frame "N" (that is, stored as the CCM frame "N").

Receiving an instruction from the scheduler unit 1103, the FIFO reading control unit 1104 reads frames from individual FIFOs of the FIFO managing unit 1102 according to the transmission order managed by the scheduler unit 1103, and transmits the read frames to the apparatus B 1100B.

The CCM frame is transmitted from the apparatus A 1100A to the apparatus B 1100B via a network.

On the other hand, in the apparatus B 1100B, the CCM identifying unit 1106 filters (identifies and sorts) frames received from the apparatus A 1100A according to frame type, i.e. data frame and CCM frame. In this example, since the received frame is a CCM frame, it is sent to the frame loss calculating unit 1108, in which frame loss calculation is performed. In the case where the received frame is a data frame, the RxFCI counter 1107 increases the count by one and the counter value is stored in a CCM-receiving-time RxFCI storing memory RxFCI(tc) of the frame loss calculating unit 1108. The preceding RxFCI(tc) value is stored in the preceding RxFCI storing memory RxFCI(tp).

When receiving the CCM frame, the frame loss calculating unit 1108 calculates, using the above-mentioned calculation formulae, frame losses of the other end of communication (far-end) and itself (near-end) based on TxFCf(tc), RxFCb(tc) and TxFCb(tc); TxFCf(tp), RxFCb(tp) and TxFCb(tp) stored in the internal memories; and the obtained RxFCI(tc) and RxFCI(tp).

In the above embodiment, the CCM generating unit 1101 receives the counter value of the TxFCI counter 1105, and also receives the increment in the counter value from the scheduler unit 1103. According to another embodiment, the scheduler unit 1103 may receive the counter value of the TxFCI counter 1105, correct the counter value by adding the increment, and then transmit the corrected counter value to the CCM generating unit 1101.

According to the above-described structure, the dual-ended ETH-LM communication apparatus of the present embodiment is capable of setting, in an OAM frame, a counter value regarding data frames true and correct at the time of transmission of the OAM frame.

Figure 12:
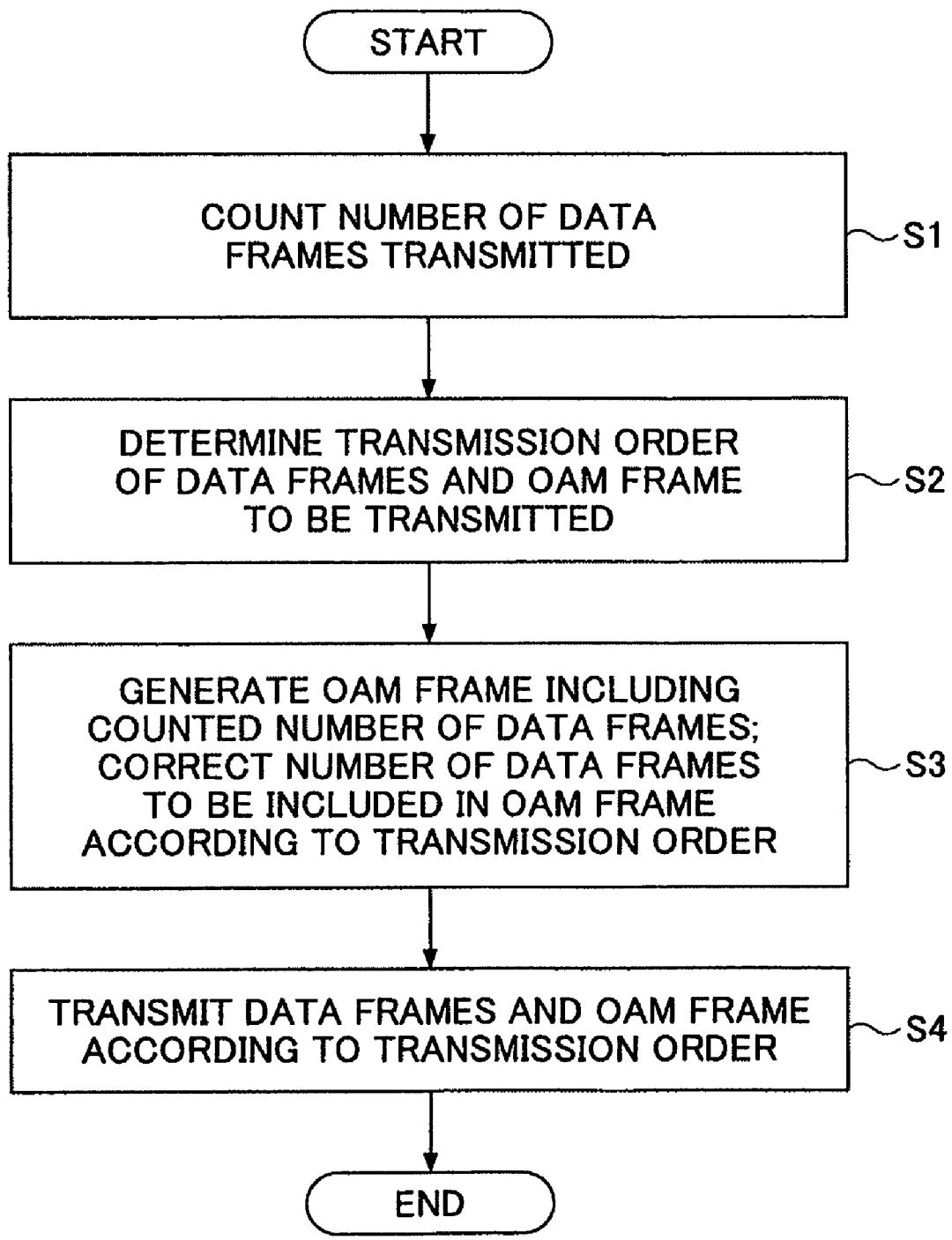
FIG. 12 is a flowchart showing an OAM frame transmission method.

FIG. 12 is a flowchart showing an OAM frame transmission method according to one embodiment. In response to a frame loss measurement request from a higher-level system, the communication apparatus starts the procedure. In Step S1, the counter counts the number of data frames transmitted. In Step S2, the scheduler (for example, the scheduler unit 1003 of FIG. 10, or the scheduler unit 1103 of FIG. 11) determines the transmission order of data frames and OAM frames to be transmitted.

In Step S3, the OAM frame generating unit (e.g. the LMM generating unit 1001 or the LMR generating unit 1009 of FIG. 10, or the CCM generating unit 1101 of FIG. 11) generates a monitoring and control frame including the counted number of data frames. Note that the number of data frames included in the monitoring and control frame is corrected according to the transmission order. Details of the correction are as described with reference to FIGS. 10 and 11. Finally, in Step S4, the data frames and OAM frames are transmitted according to the transmission order.

The above OAM frame transmission method may be implemented as a computer program that causes a microprocessor or a microcontroller to execute each step of the method.

Figure 13:
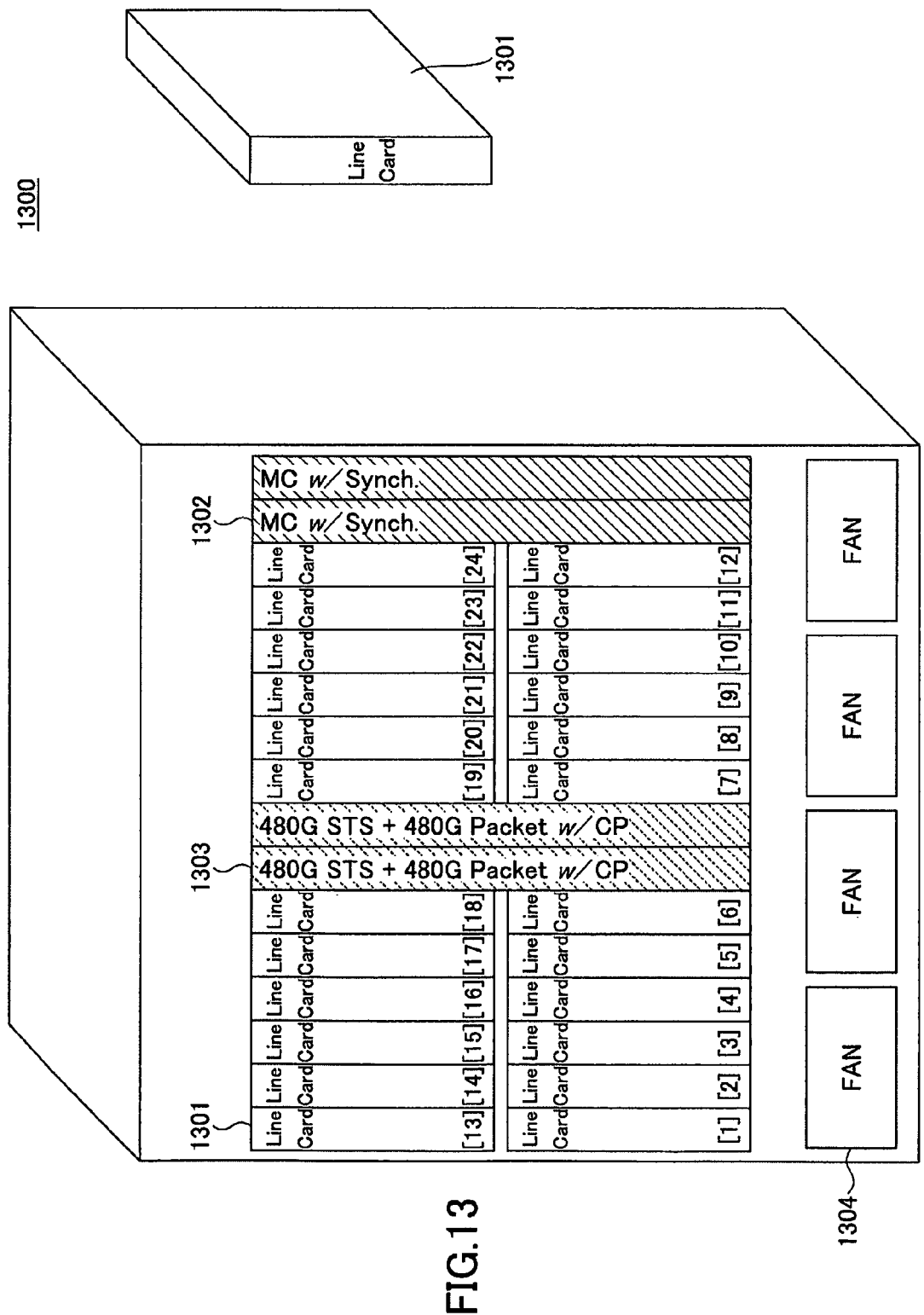
FIG. 13 shows a communications system according to one embodiment.

FIG. 13 shows a shelf-type communication apparatus according to one embodiment. A shelf-type communication apparatus 1300 of FIG. 13 includes 28 slots, for example. Into these slots, multiple (24, in this case) line cards 1301 that correspond to communication apparatuses of one embodiment described with reference to FIG. 10 and/or FIG. 11 can be inserted. Besides the line cards 1301, the shelf-type communication apparatus also includes special slots for inserting MC cards 1302 having functions of a network management interface terminal and a DCC terminal and SW cards 1303 having functions of a 480 Gb/s STS switch and a 480 Gb/s packet switch. In addition, multiple fans 1304 for cooling down these cards are provided.

While the embodiments of the present disclosure have been described in detail, it should be understood that the present invention is not limited to these specific embodiments, and various changes and modification may be made to the particular examples without departing from the scope of the present invention as defined in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A communication apparatus, comprising:
a transmitter that includes a counter for counting a number of transmitted data frames and indicating the counted number of the transmitted data frames as a counter value and a scheduler for determining a frame transmission order, the transmitter being configured to transmit one or more data frames and a monitoring and control frame which includes the counter value; and
a frame generator configured to generate the monitoring and control frame,
wherein when generating the monitoring and control frame, the frame generator corrects the counter value included in the monitoring and control frame according to the frame transmission order.

2. The communication apparatus as claimed in claim 1, wherein the transmitter further includes a first FIFO to which the one or more data frames are input and a second FIFO to which the monitoring and control frame is input.

3. The communication apparatus as claimed in claim 1, wherein the frame generator calculates, based on the frame transmission order, change in the counter value indicated by the counter to be made by a time when the monitoring and control frame is transmitted.

4. The communication apparatus as claimed in claim 1, further comprising a frame loss calculator configured to calculate frame loss based on another monitoring and control frame received from a different communication apparatus in communication with the communication apparatus.

5. The communication apparatus as claimed in claim 1, wherein the monitoring and control frame relates to frame loss measurements.

6. The communication apparatus as claimed in claim 2, further comprising a reading controller configured to control transmission of the one or more data frames from the first FIFO and transmission of the monitoring and control frame from the second FIFO.

7. The communication apparatus as claimed in claim 1, wherein the scheduler determines the frame transmission order by a transmission order determining algorithm, which is one of a round robin algorithm, a weighted round robin algorithm and a strict priority algorithm.

8. A shelf-type communication apparatus, comprising:
- a plurality of line-card type communication apparatuses, each of which includes a transmitter that includes a counter for counting a number of transmitted data frames and indicating the counted number of the transmitted data frames as a counter value and a scheduler for determining a frame transmission order, and is configured to transmit one or more data frames and a monitoring and control frame which includes the counter value, and a frame generator configured to generate the monitoring and control frame,
- wherein when generating the monitoring and control frame, the frame generator corrects the counter value included in the monitoring and control frame according to the frame transmission order, and
- each of the line-card type communication apparatuses is inserted into a corresponding slot of the shelf-type communication apparatus.

9. A monitoring and control frame transmission method, comprising:
- counting a number of transmitted data frames and indicating the counted number of the transmitted data frames as a counter value;
- determining a frame transmission order of one or more data frames and a monitoring and control frame to be transmitted, the monitoring and control frame including the counter value;
- generating the monitoring and control frame including the counted number of the data frames; and
- transmitting the one or more data frames and the monitoring and control frame based on the frame transmission order,
- wherein the counter value included in the monitoring and control frame is corrected according to the frame transmission order.

10. The monitoring and control frame transmission method as claimed in claim 9, further comprising inputting the one or more data frames to a first FIFO and inputting the monitoring and control frame to a second FIFO.

11. The monitoring and control frame transmission method as claimed in claim 9, further comprising calculating, based on the frame transmission order, change in the counter value to be made by a time when the monitoring and control frame is transmitted.

12. The monitoring and control frame transmission method as claimed in claim 9, further comprising calculating frame loss based on another monitoring and control frame received from a communication apparatus in communication.

13. The monitoring and control frame transmission method as claimed in claim 9, wherein the monitoring and control frame relates to frame loss measurements.

14. The monitoring and control frame transmission method as claimed in claim 10, further comprising controlling transmission of the one or more data frames from the first FIFO and transmission of the monitoring and control frame from the second FIFO.

15. The monitoring and control frame transmission method as claimed in claim 11, wherein the frame transmission order is managed according to a transmission order determining algorithm, which is one of a round robin algorithm, a weighted round robin algorithm and a strict priority algorithm.

16. A non-transitory computer-readable storage medium storing a program for causing a computer to execute a method, the method comprising:
- counting a number of transmitted data frames and indicating the counted number of the transmitted data frames as a counter value;
- determining a frame transmission order of one or more data frames and a monitoring and control frame to be transmitted, the monitoring and control frame including the counter value;
- generating the monitoring and control frame including the counted number of the data frames; and
- transmitting the one or more data frames and the monitoring and control frame based on the frame transmission order.
- wherein the counter value included in the monitoring and control frame is corrected according to the frame transmission order.

* * * * *